(12) United States Patent
Kim et al.

(10) Patent No.: US 9,775,159 B2
(45) Date of Patent: Sep. 26, 2017

(54) BEARER MANAGEMENT METHOD AND APPARATUS FOR USE IN BEAMFORMING-BASED RADIO COMMUNICATION SYSTEM

(71) Applicant: Samsung Electronics Co., Ltd., Gyeonggi-do (KR)

(72) Inventors: Sangjin Kim, Gyeonggi-do (KR); Yungsoo Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 77 days.

(21) Appl. No.: 14/557,039

(22) Filed: Dec. 1, 2014

(65) Prior Publication Data
US 2015/0156780 A1   Jun. 4, 2015

(30) Foreign Application Priority Data

Nov. 29, 2013 (KR) ........................ 10-2013-0147040

(51) Int. Cl.
| | |
|---|---|
| *H04W 72/04* | (2009.01) |
| *H04W 36/22* | (2009.01) |
| *H04L 5/00* | (2006.01) |
| *H04B 7/06* | (2006.01) |
| *H04B 7/024* | (2017.01) |

(52) U.S. Cl.
CPC ....... *H04W 72/0486* (2013.01); *H04L 5/0035* (2013.01); *H04W 36/22* (2013.01); *H04B 7/024* (2013.01); *H04B 7/0617* (2013.01); *H04B 7/0632* (2013.01)

(58) Field of Classification Search
CPC . H04W 72/0486; H04W 72/04; H04W 36/22; H04L 5/0035; H04B 7/0632; H04B 7/024; H04B 7/0617

USPC .......................................... 370/331, 312, 311
See application file for complete search history.

(56) References Cited

U.S. PATENT DOCUMENTS

| | | | |
|---|---|---|---|
| 2008/0310324 A1* | 12/2008 | Chaponniere ........... | H04L 47/10 370/254 |
| 2012/0201215 A1 | 8/2012 | Shaheen | |
| 2013/0088979 A1* | 4/2013 | Bi .......................... | H04B 7/024 370/252 |
| 2013/0114408 A1 | 5/2013 | Sastry et al. | |

(Continued)

OTHER PUBLICATIONS

European Search Report dated May 19, 2015 issued in counterpart Appln. No. 14195376.0-1854.

*Primary Examiner* — Kwang B Yao
*Assistant Examiner* — Syed M Bokhari
(74) *Attorney, Agent, or Firm* — The Farrell Law Firm, P.C.

(57) ABSTRACT

Methods and apparatuses are provided for bearer arrangement in a beamforming-based radio communication system. Channel qualities of cells available for communication with an electronic device and cell loads stored are checked in a scheduling table, when a service flow configuration request message is received for providing a service flow to the electronic device is received. Radio access bearer configuration request messages, which include individual data rates to be supported by each of at least two cells, are transmitted to the at least two cells, when the service flow requires configuring bearers of the at least two cells. The service flow is provided through the bearers, when radio access bearer complete messages are received from the at least two cells.

16 Claims, 19 Drawing Sheets

(56) References Cited

U.S. PATENT DOCUMENTS

2013/0170474 A1\* 7/2013 Bi .................... H04W 36/0055
    370/332
2013/0176988 A1   7/2013 Wang et al.
2015/0009874 A1\* 1/2015 Edara ................ H04W 52/0225
    370/311
2015/0327171 A1\* 11/2015 Chung ................ H04W 76/048
    370/311

\* cited by examiner

BEARER MANAGEMENT METHOD AND APPARATUS FOR USE IN BEAMFORMING-BASED RADIO COMMUNICATION SYSTEM

PRIORITY

This application claims priority under 35 U.S.C. §119(a) to a Korean patent application filed on Nov. 29, 2013 in the Korean Intellectual Property Office and assigned Serial No. 10-2013-0147040, the content of which is incorporated herein by reference.

BACKGROUND OF THE INVENTION

1. Field of the Invention

The present invention relates generally to a method and apparatus for managing bearers in a radio communication system, and more particularly, to a bearer management method and apparatus for use in a beamforming-based radio communication system.

2. Description of the Related Art

With the rapid popularization of wireless Internet communication devices, such as smartphones, the demand for mobile data dramatically grows by about 50% to 200% annually. In order to meet the rapid increasing demand for the mobile communication data, various data rate enhancement technologies have been developed. One of the most promising data enhancement methods is to broaden the frequency band, which is difficult to achieve due to the limited frequency spectrum allocated for mobile communication systems. It is not difficult to secure a relatively large frequency band of about a few hundreds of MHz to a few GHz in the frequency range of 28 GHz, 38 GHz.

However, the radio signal is characterized in that its strength attenuation increases as the frequency increases, and thus, although it is used for radio communications, the significant signal attenuation of ultra-high frequency (28 GHz or beyond), restricts the cell size and service area. In contrast, since the antenna decreases in size as the frequency increases, it is facilitated to integrate a plurality of antenna devices into an array in the ultra-high frequency range for beamforming to achieve high beamforming gain.

SUMMARY OF THE INVENTION

The present invention has been made to address at least the above problems and/or disadvantages and to provide at least the advantages described below. Accordingly, an aspect of the present invention provides a bearer management method and apparatus that is capable of allocating at least two bearers to an electronic device having an antenna array in a radio communication system.

Another aspect of the present invention provides a bearer management method and apparatus for transmitting data through separated bearers allocated to an electronic device using an antenna array in a radio communication system.

An additional aspect of the present invention provides a bearer management method and apparatus that is capable of allocating bearers to an electronic device using an antenna array in adaptation to the channel condition in a radio communication system.

A further aspect of the present invention provides a bearer management method and apparatus that is capable of transmitting data through the channels allocated to an electronic device using an antenna array adaptively in a radio communication system.

In accordance with an aspect of the present invention, a method is provided for bearer arrangement at a gateway of a beamforming-based radio communication system. Channel qualities of cells available for communication with an electronic device and cell loads stored are checked in a scheduling table, when a service flow configuration request message is received for providing a service flow to the electronic device is received. Radio access bearer configuration request messages, which include individual data rates to be supported by each of at least two cells, are transmitted to the at least two cells, when the service flow requires configuring bearers of the at least two cells. The service flow is provided through the bearers, when radio access bearer complete messages are received from the at least two cells.

In accordance with another aspect of the present invention, an apparatus is provided for managing bearers in a beamforming-based radio communication system. The apparatus includes a network communication unit configured to communicate with a correspondent node providing an electronic device with a service flow and information necessary for providing the service flow. The apparatus also includes a base station communication unit configured to communicate data of the service flow and service flow configuration and change request signals with base stations connected hierarchically. The apparatus additionally includes a memory configured to store scheduling information messages received from the base stations. The apparatus further includes a control unit configured to check channel qualities of cells available for communication with the electronic device and cell loads stored in a scheduling table when a service flow configuration request message is received for providing a service flow to the electronic device, transmit, to at least two cells, radio access bearer configuration request messages, which include individual data rates to be supported by each of the at least two cells when the service flow requires configuring bearers of the at least two cells, and provide the service flow through the bearers when radio access bearer complete messages are received from the at least two cells.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
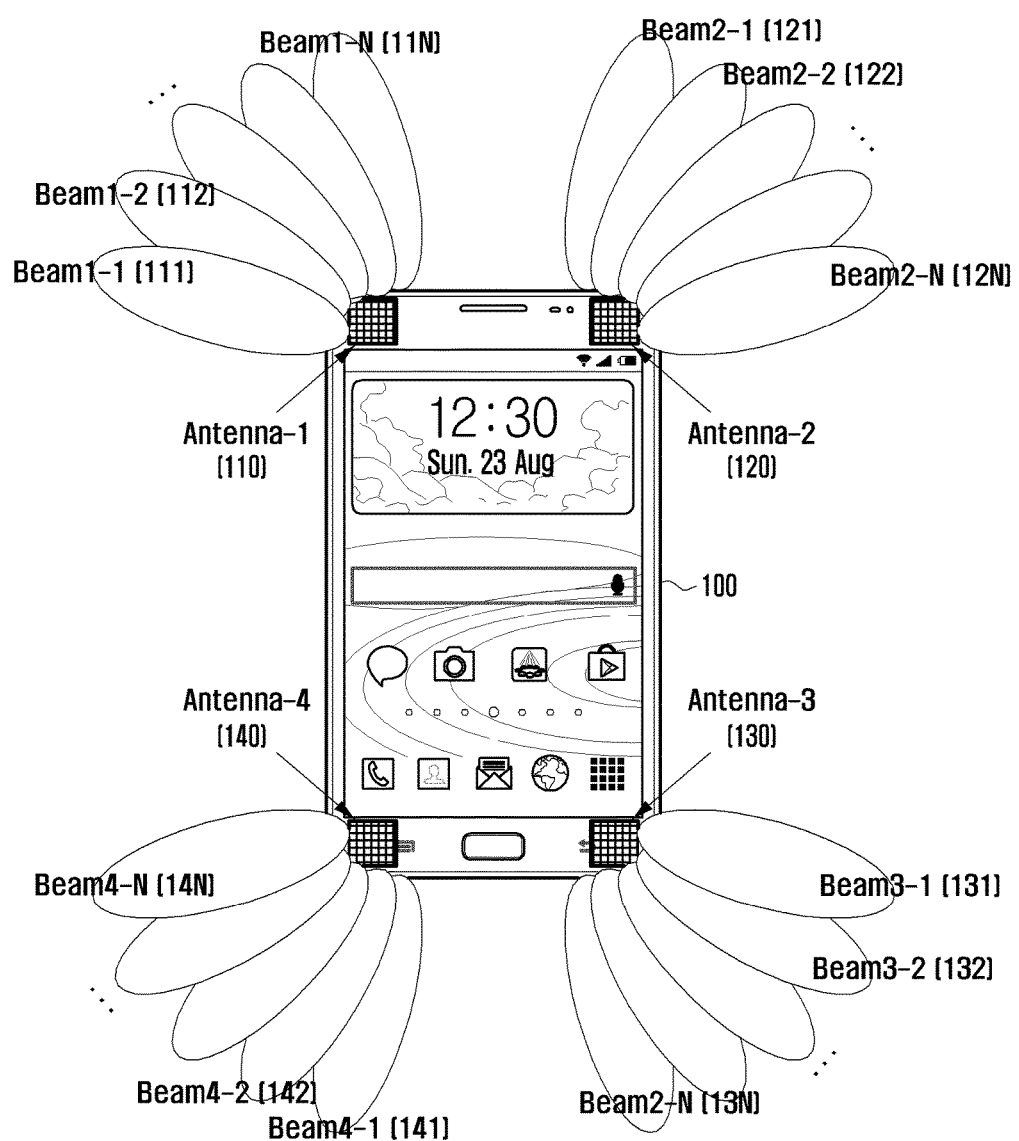
FIG. 1 is a diagram illustrating an electronic device having a plurality of antenna arrays arranged to receive signals in different directions, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The beamforming antenna for use in a radio communication system is described in detail below.

The beamforming antenna transmits or receives a beam in one direction at an instant and then another beam in a different or same direction at the next instant. However, the beam direction that can be formed by a beamforming antenna is restricted to a partial range of 360 degrees due to its physical characteristic.

Unlike the beamforming antenna, which is restricted by its physical characteristic, the electronic device for use in the radio communication system has to transmit/receive omnidirectionally. In embodiments of the present invention, the electronic device is provided with a plurality of beamforming antennas oriented in different directions to transmit/receive signals in the full range of 360 degrees.

One beamforming array antenna is composed of many antenna elements. According to an embodiment of the present invention, the antenna elements are sorted into two beamforming antenna arrays operating independently. According to another embodiment of the present invention, the antenna elements are sorted into three or more beamforming antenna arrays operating independently.

Since the antenna elements of one beamforming array antenna are grouped into respective beamforming antenna arrays operating independently, it is possible to allocate the antenna arrays to different bearers.

FIG. 1 is a diagram illustrating an electronic device having a plurality of antenna arrays arranged to receive signals in different directions, according to an embodiment of the present invention.

Referring to FIG. 1, an electronic device 100 includes four beamforming antenna arrays 110, 120, 130, and 140. Although the electronic device 100 is depicted in the form of a mobile communication terminal in FIG. 1, it can be configured as any type of device such as, for example, a Personal Digital Assistant (PDA), a tablet computer, a laptop computer, and a Personal Computer (PC). If an electronic device is implemented to operate as follows, it does not matter what the device is called, and the examples of the electronic device include all types of electronic devices and terminals capable of performing the operations as follows.

The electronic device 100 has a rectangular contour. The electronic device 100 is provided with the antenna arrays 110, 120, 130, and 140 arranged at the four corners of the rectangular contour, as shown in FIG. 1. The beamforming array antenna is referred to an array antenna because it is composed of many antenna elements, and is referred to as a beamforming antenna because it forms a beam in a direction. The terms 'beamforming antenna,' 'array antenna,' and 'beamforming array antenna' should be construed as having the same meaning, although the term 'beamforming antenna' is used representatively in the following description for purposes of convenience.

The first beamforming antenna 110 positioned at the top left corner is capable of forming beams 111, 112, . . . , 11N oriented various directions in a first beamforming angle range. Likewise, the second beamforming antenna 120 is capable of forming beams 121, 122, . . . , 12N in second beamforming angle range. Also, the third and fourth beamforming antennas are capable of forming beams 131, 132, . . . , 13N, 141, 142, . . . , 14N in respective third and fourth beamforming angle ranges in the same way.

When the beamforming antennas are mounted at two or more different positions, as shown in FIG. 1, it is possible to compensate for the aforementioned problem of using the signal beamforming antenna (i.e., restriction of the beam direction to a partial range of 360 degrees), which is caused by the physical characteristic of the beamforming antenna.

When two or more beamforming antennas are mounted at different parts, as described above, the electronic device 100 is capable of receiving/transmitting one or more beams using one or more beamforming antenna simultaneously in different directions. One beamforming antenna can transmit/receive the signal in one beam direction at an instant. If it is necessary to change the direction of the beam formed at a certain instant to another direction at the next instant, the electronic device 100 is capable of adjusting the corresponding beamforming antenna to form the beam in the changed direction in a unit of the transmission/reception period.

As shown in FIG. 1, the beamforming antenna mounted at a specific part of the electronic device 100 is restricted in beam direction. For example, the first beamforming antenna 110 mounted at the top left corner of the electronic device 100 is restricted in beamforming to the top left directions, the second beamforming antenna 120 at the top right corner is restricted to the top right directions, the third beamforming antenna 130 at the bottom right corner is restricted to the bottom right directions, and the fourth beamforming antenna 140 at the bottom left corner is restricted to the bottom left directions.

Since the directional beamforming restriction is caused by characteristics of the beamforming antenna, the electronic device 100 can be implemented with the more or fewer beamforming antennas than those depicted in FIG. 1, depending on whether it is necessary to tune a beamforming direction finely or roughly.

The electronic device 100, equipped with the two or more beamforming antennas as described above, searches for the base station with which communication can be performed through the best beam.

Figure 2A:
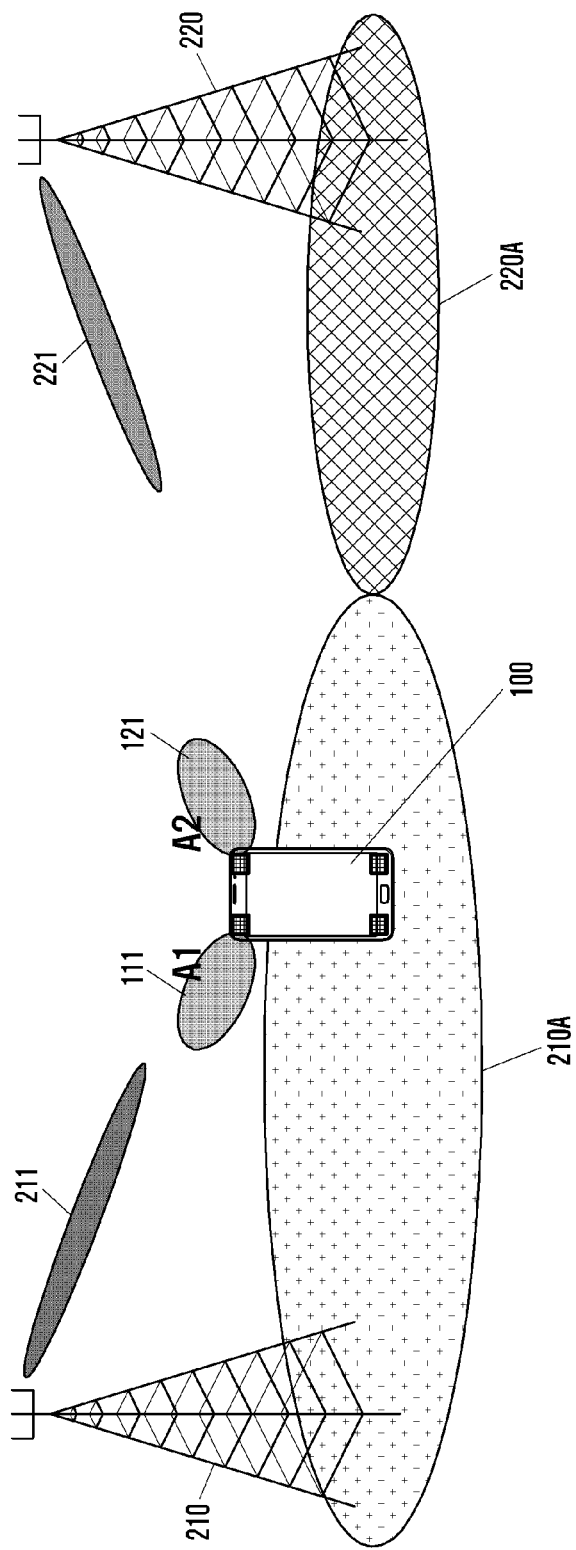
FIGS. 2A to 2C are diagrams illustrating procedures for an electronic device equipped with at least two beamforming antennas to select a best base station, according to an embodiment of the present invention.
Figure 2B:
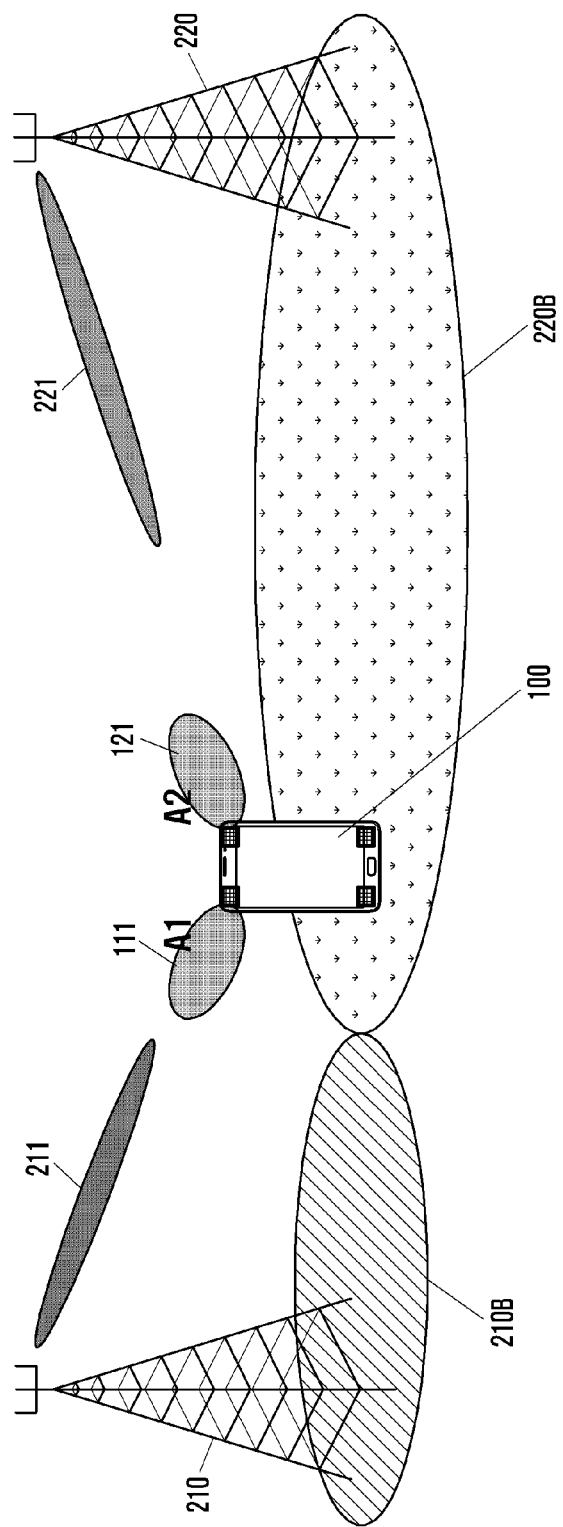
Figure 2C:
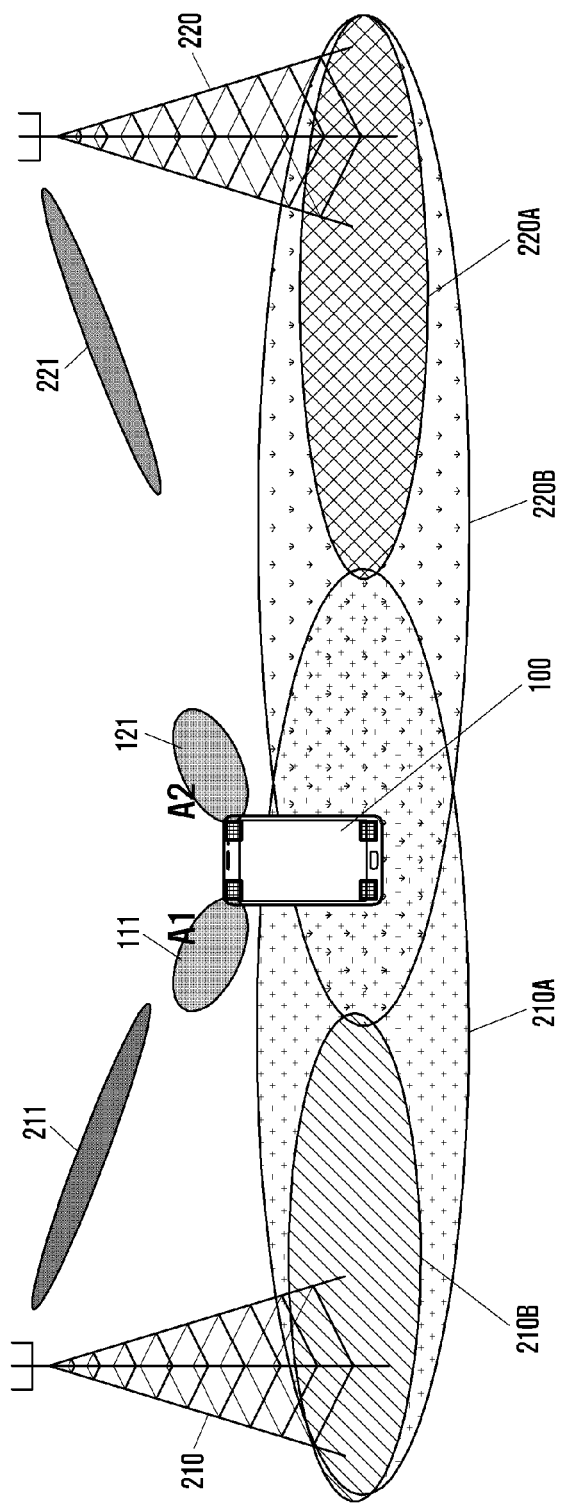

FIGS. 2A to 2C are conceptual diagrams illustrating procedures for an electronic device equipped with at least two beamforming antennas to select a best base station, according to an embodiment of the present invention.

Referring to FIG. 2A, the electronic device is identical with the electronic device 100 of FIG. 1, and is located between two neighboring base stations 210 and 220.

When the electronic device 100 is located in a normal handover area in which the signals of the base stations 210 and 220 reach or an area close to the handover area, the strengths or qualities of the signals measured by means of the respective antennas may differ from each other. For convenience, the description set forth below is directed to the operation in the handover area or the area close to the handover area in FIGS. 2A to 2C. In a future ultra-high speed communication system, however, the service area of a base station may decrease as compared to that of the current cellular system. Accordingly, the location of the electronic device, which is directed in association with embodiments of the present invention, can be anywhere in the area in which the electronic device is capable of receiving the signals from at least two base stations.

FIG. 2A shows the case where the electronic device 100 measures the signal levels of the first and second base stations 210 and 220 in view of the first beam (Beam1-1) 111 formed by the first beamforming antenna 110. For example, the first base station 210 is located near the electronic device 100 in view of the first beam 111 formed by the first beamforming antenna 110, such that the signal reach area of the first base station is formed broadly as denoted by reference number 210A. In contrast, the second base station 220 is located far from the electronic device 100 in view of the first beam 111 formed by the first beamforming antenna 110, such that the signal reach area of the second base station 220 is formed narrowly as denoted by reference number 220A.

Accordingly, the beam or signal from the first base station 210 is good in quality in view of the first beamforming antenna 110 of the electronic device 100, such that the first base station 210 is likely to be regarded as the base station available for the service. In contrast, the beam or signal from the second base station 220 is bad in quality in view of the first beamforming antenna 110, such that the second base station is likely to be regarded as the base station unavailable for the service.

Referring to FIG. 2B, the signal levels of the first and second base stations 210 and 220 are measured in view of the second beam (Beam2-1) 121 from by the second beamforming antenna 120 of the electronic device. That is, the first base station 210 is located far from the electronic device 100 in view of the first beam 121 formed by the second beamforming antenna 120, such that the signal reach area of the first base station 210 is formed narrowly as denoted by reference number 210B. In contrast, the second base station 220 is located near the electronic device 100 in view of the first beam 121 formed by the second beamforming antenna 120, such that the signal reach area of the second base station 220 is formed broadly as denoted by reference number 220B.

Accordingly, the beam or signal from the first base station 210 is bad in quality in view of the second beamforming antenna 120 of the electronic device 100, such that the first base station 210 is likely to be regarded as an unavailable base station for the service. In contrast, the beam or signal from the second base station 220 is good in quality in view of the second beamforming antenna 120, such that the second base station is likely to be regarded as an unavailable base station for the service.

As described with reference to FIGS. 2A and 2B, the electronic device 100 is provided with the antennas forming the different direction beams so as to have the best base station available for communication per antenna. The signal reach areas of the antenna-specific best base stations of FIGS. 2A and 2B can be depicted integrally as shown in FIG. 2C.

Referring to FIG. 2C, the service areas (cells) of the first and second base stations 210 and 220 are defined differently by the beams 111 and 121 formed by the first and second beamforming antennas 110 and 120 of the electronic device 100.

The electronic device 100 is capable of transmitting/receiving signals to and from the first base station 210 located near the first beamforming antenna 110 with the amplification as much as the beam gains. However, the signal received from the second base station 220 located far from the first beamforming antenna 110 of the electronic device 100 attenuates, such that the signal reach area of the second base station 220 may be bounded as denoted by reference number 220B in view of the first beamforming antenna 110. Likewise, the electronic device 100 receives the beam transmitted by the second base station 220 located near the second beamforming antenna 120 with the amplification as much as the beam gain. The signal from the first base station 210 located far from the second beamforming antenna of the electronic device is received as attenuated.

For this reason, the service area or cell of the first base station 210 can be depicted as denoted by reference number 210A in view of the first beamforming antenna 110 of the electronic device 100, while the service area or cell of the second base station 220 as denoted by reference number 220A. In contrast, the service area or cell of the first base station 210 can be depicted as denoted by reference number 210B in view of the second beamforming antenna 120 of the electronic device 100 while the service area or cell of the second base station 220 as denoted by reference number 220B.

As described above, the electronic device 100 having a plurality of beamforming antennas is capable of checking the antenna-specific cell areas. This means that the best base station or cell can be determined per antenna. In this case, the electronic device is capable of connecting to the antenna-specific best cells simultaneously for communications.

The embodiments of the present invention are differentiated from cellular mobile communication technology characterized in that an electronic device or terminal communicates with one serving cell on the basis of the assumption in that the antenna-specific cell sizes are identical in average. As a consequence, the conventional bearer management method is not applicable to the communication environment of the present invention in which the best cell is determined differently per antenna, and therefore there is a need of a new bearer management method.

Figure 3:
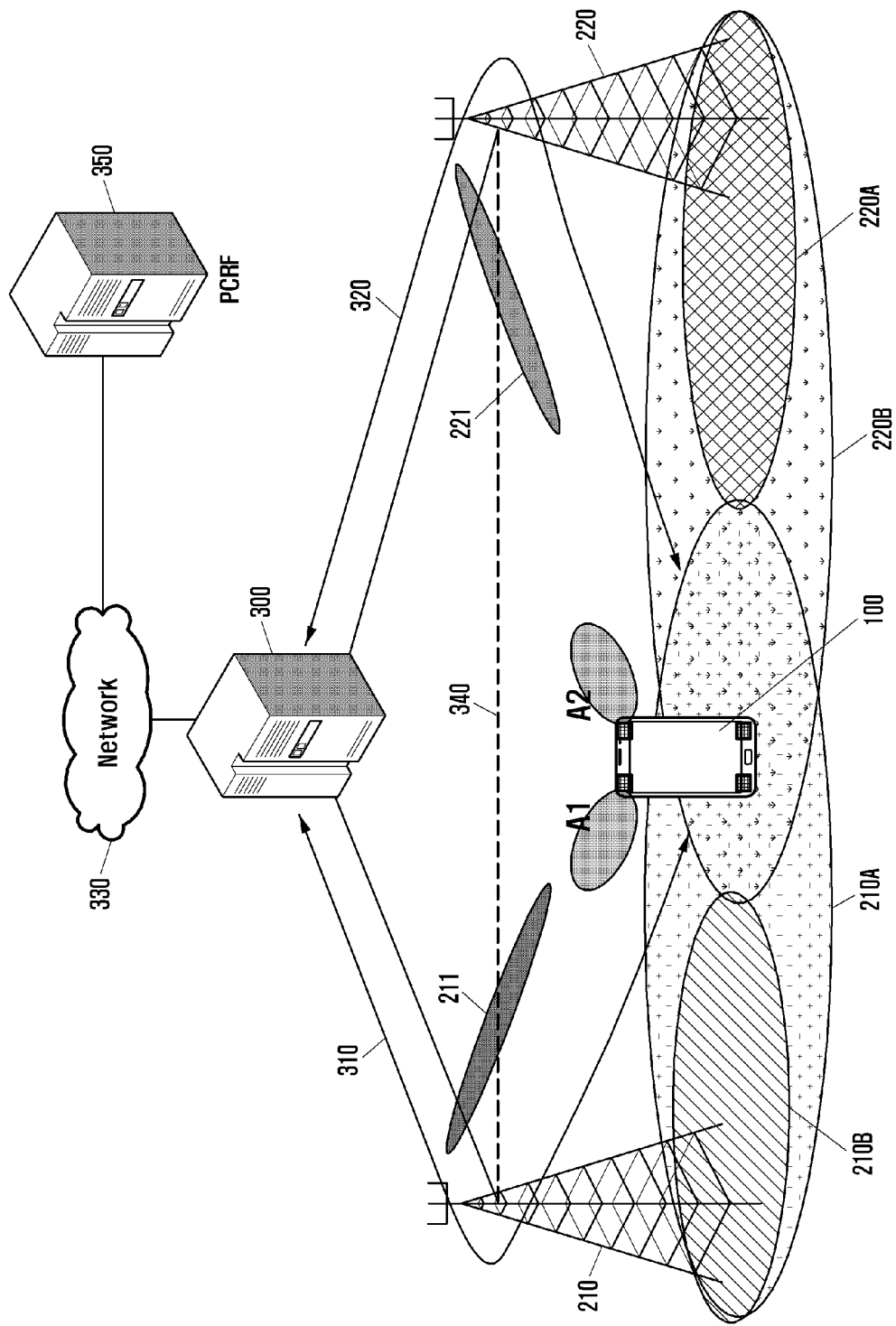
FIG. 3 is a diagram illustrating architecture of a cellular mobile communication network capable of configuring at least two bearers to an electronic device, according to an embodiment of the present invention.

FIG. 3 is a diagram illustrating architecture of a cellular mobile communication network capable of configuring at least two bearers to an electronic device, according to an embodiment of the present invention.

The system of FIG. 3 integrates the configurations of FIGS. 1 and 2A to 2C. The system further includes a gateway 300 capable of transmitting controls signals and data to the base stations 210 and 220, and a Policy and Charging Rules Function (PCRF) 350 for providing the information on the service to be provided to the electronic device 100. These components may be understood as hierarchical entities. For example, the system may be composed of the low level base stations 210 and 220, the intermediate level gateway 330, and the high level PCRF 350. Although not shown in FIG. 3, the system may further include a correspondent node for providing the service data. The correspondent node may be a gateway belonging to the same level as the gateway 300, a certain electronic device, or a node existing at a level higher than the gateway 300 as a server providing application programs. Accordingly, the gateway 300 may transmit data to the electronic device 100 through the network 330, or may delay the data from the electronic device 100 to another electronic device.

The gateway 300 and the base stations 210 and 220 are connected through the normal S1 interface, the base stations 210 and 220 are connected with each other through the X2 interface. Such interface formats are introduced as examples to help understand the embodiments of the present invention but do not limit the embodiments of the present invention.

FIG. 3 is directed to an embodiment in which the electronic device establishes bearers with the first and second base stations 210 and 220 simultaneously and, particularly, a first bearer 310 established between the gateway 300 and the electronic device 100 via the first base station 210 is marked with a separate line to assist in understanding the present invention. Also, a second bearer 320 established between the gateway 300 and the electronic device 100 via the second base station 220 is marked with a separate line to assist in understanding the present invention.

According to an embodiment of the present invention, the gateway 300, which is capable of allocating at least two bearers to one electronic device 100 may manage the channel quality per serving cell, information on the load per cell, and Quality of Service (QoS) requirement per bearer in the form of a table. The channel quality and per-cell load information may be updated through the scheduling information message from the base stations 210 and 220. Descriptions on the channel quality and per-cell load information are described in greater detail below with reference to the gateway.

The QoS requirement information of the bearers, which the gateway 300 manages, may be acquired from the PCRF 350, which provides the QoS information on the corresponding bearer in the bearer setup procedure. The configuration and operation of the gateway 300 are described in greater detail below with reference to the accompanying block diagram.

The base stations 210 and 220 may update the information on the channel quality and load level of the cell per electronic device capable of communicating (in the course of communication) in its service area or cell at a certain interval. Each of the base stations 210 and 220 may send the gateway 300 a scheduling information message including the updated channel quality information and load level information per cell. Each of the base stations 210 and 220 may measure the per-cell load level in consideration of both the Physical Resource Block (PRB) utilization and per-bearer throughput, only the PRB utilization, or only the per-bearer throughput.

In the following description, the base station may be the base station having one cell or the base station having three or more cells. In the following description, the base station can be understood as a cell or as the base station having a plurality of cells. Accordingly, the load of the base station may be the sum of the loads of the plural cells or the load of a specific cell. The quality of the radio channel between the base station and electronic device may be the radio channel quality between one base station and one electronic device or the radio channel quality between the cell in communication among multiple cells of the base station and the electronic device.

As described above, the electronic device 100 includes a plurality of beamforming antennas, which may have the best cells or base stations. If the per-antenna best cells or base stations are selected, the electronic device 100 generates radio channel information, e.g., a Channel Quality Indicator (CQI), and transmits the CQI to the cells or base stations having the best channel qualities through the corresponding beamforming antennas. According to an embodiment of the present invention, the electronic device 100 may establish the bearers with the two or more base stations or cells using the respective beamforming antennas for communication.

Figure 4:
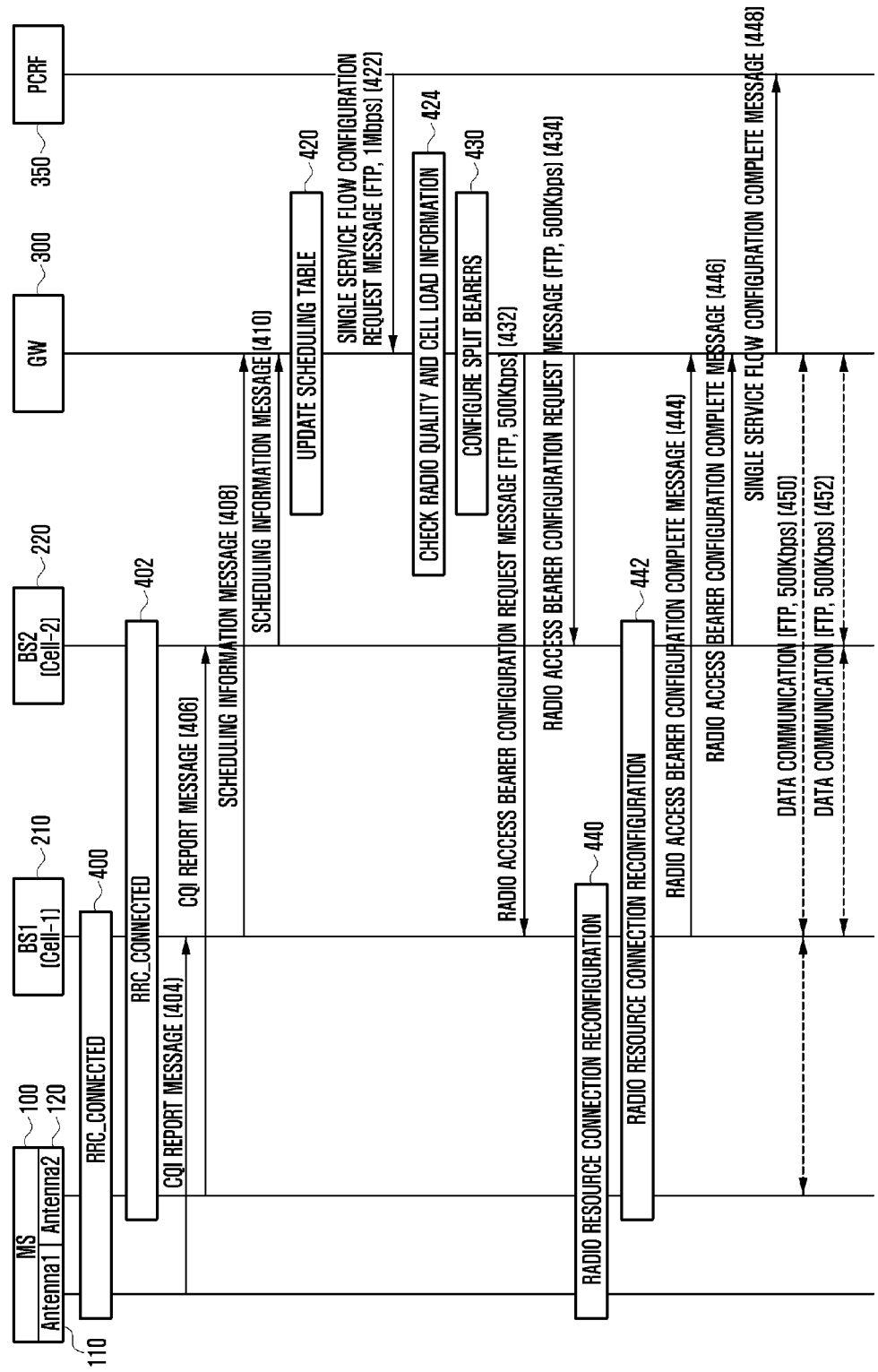
FIG. 4 is a signal flow diagram illustrating a procedure of configuring single service flow into multiple bearers, according to an embodiment of the present invention.

FIG. 4 is a signal flow diagram illustrating a procedure of configuring single service flow into multiple bearers, according to an embodiment of the present invention.

FIG. 4 is directed to the bearer management procedure for communication with multiple cells or a base station when the electronic device 100, having a plurality of beamforming antennas, connects to multiple cells or base stations simultaneously. In this case, the electronic device 100 configures bearers with different base stations using the two different beamforming antennas. However, it would be obvious to those skilled in the art that the electronic device is capable of configuring bearers with three or more base stations using the corresponding number of beamforming antennas through the procedure depicted in FIG. 4.

In step 400, the electronic device 100 is in the Radio Resource Control (RRC) Connected state with the first base station 210, which is selected as the best base station for the first beamforming antenna 110 of the electronic device 100, and thus, allocates radio resources between the first beamforming antenna 110 and the first base station 210. In step 402, the electronic device 100 is in the RRC Connected state with the second base station 220, which is selected as the best base station for the second beamforming antenna 120 of the electronic device 100, and thus, allocates radio resources between the second beamforming antenna 120 and the second base station 220.

The electronic device 100 measures the channel quality based on the connection state with the first base station 210 by means of the first beamforming antenna 110 and transmits the CQI generated based on the measurement result to the first base station 210, in step 404. The electronic device 100 also measures the channel quality based on the connection state with the second base station 220 by means of the second beamforming antenna 120, and transmits the CQI generated based on the measurement result to the second base station 220, in step 406. The first and second base stations 210 and 220 may be the different cells belonging to a base station.

If the CQI on the radio channel configured with the first beamforming antenna 110 of the electronic device 100 is received, the first base station 210 transmits a scheduling information message including the CQI to the gateway 300, in step 408. If the CQI on the radio channel configured with the second beamforming antenna 120 of the electronic device is received, the second base station 220 transmits a scheduling information message including the CQI to the gateway 300, in step 410.

The above-described steps 400 and 402 may be performed in the order as depicted in FIG. 4, simultaneously, or in the order of step 402 and step 400. Steps 404 and 406 also may be performed in the order as depicted in FIG. 4, simultaneously, or in the order of step 406 and step 404. Likewise, steps 408 and 410 may be performed in the order as depicted in FIG. 4, simultaneously, or in the order of step 410 and step 408.

That is, the radio resource allocation and channel report may occur first between the first beamforming antenna 110 and the first base station 210 or between the second beamforming antenna 120 and the second base station. It should be noted that the execution order of the steps are not essential with respect to the embodiments of the present invention.

If the scheduling information messages are received from the base stations 210 and 220, in steps 408 and 410, the gateway 300 updates the scheduling table information based on the received scheduling information message, in step 420. The scheduling table is described in greater detail below with reference to the block diagram of the gateway. The gateway 300 may update the scheduling table information periodically at a predetermined interval or when radio resource allocation necessity occurs between the base station and the electronic device.

The gateway 300 receives a Single Service Flow Configuration Request message addressed to the electronic device from the PCRF, in step 422. As described above, the Single Service Flow Configuration Request message may include the identifier of the electronic device as the service receiver, application type of the service to be provided, and service quality. The identifier of the electronic device may be the Internet Protocol (IP) address, phone number, email address, and the like, of the electronic device. Examples of the application type of the service include File Transfer Protocol (FTP) service, Voice over IP (VoIP) service, motion picture service, etc. The service quality information may include at least one of minimum required data rate, maximum data rate, and tolerable delay.

It is assumed that the single service flow configuration request received in step 422 indicates the FTP service and 1 Mbps.

The gateway 300 looks up the scheduling table of the base stations to which the electronic device 100 is connected to provide the requested signal service flow, so as to check the channel qualities and load levels of the connected base stations. The reason for looking up the scheduling table is to select the best cell or base station to provide the FTP service at the data rate of 1 Mbps.

The gateway 300 looks up the scheduling tables of the respective base stations to which the electronic device 100 has connected and allocates bearers to the best cells based on the channel qualities and cell load information, in step 424. At this time, the gateway 300 may allocate multiple bearers or one bearer to the cells for the service flow. FIG. 4 is directed to an embodiment in which multiple bearers are allocated for one service flow.

The gateway 300 determines to configure multiple bearers for providing the electronic device 100 with the signal service flow, in step 430. The gateway 300 sends the base stations 210 and 220 capable of communicating with the electronic device 100 a radio access bearer configuration request message, in steps 432 and 434. The radio access bearer configuration request message may include the identifier of the electronic device, required data rate, and service type information.

FIG. 4 is directed to the case where the gateway 300 allocates the bearers capable of carrying the same data amount of 500 Kbps. However, the bearers may be allocated so as to carry the same data amount as in FIG. 4 or different amounts of data.

A description is made of the situation where the bearers are allocated to carry the same data amount, as shown in FIG. 4. As described above, the service flow requested to be provided to the electronic device 100 is the FTP service at the data rate of 1 Mbps. In this case, the gateway 300 may send the base stations 210 and 220 a bearer configuration request so as to configure the bearers allocated to the bearers between the gateway 300 and the first base station 210 and between the gateway 300 and the second base station 220 to have the same data rate of 500 Kbps, in steps 432 and 434.

Then the first and second base stations 210 and 220 reconfigure radio resource connections with the first and second beamforming antennas 110 and 120 of the electronic device 100, in steps 440 and 442. That is, the first and second base stations 210 and 220 allocate radio resources for providing the service flows at 500 Kbps to the first and second beamforming antennas 110 and 120 of the electronic device 100, in steps 440 and 442.

In order to provide service flows at 500 Kbps, the base stations 210 and 220 configure the radio bearers with the electronic device at step 440 and 442 and send the gateway 300 a radio access bearer configuration complete message, in steps 444 and 446, respectively.

If the radio access bearer configuration has completed, the gateway sends the PCRF 350 a single service flow configuration complete message, in step 448. The single service flow configuration complete message may include information notifying of the completion of the service flow configuration.

The gateway 300 transmits/receives data through the bearers established between the base stations 210 and 220 and the antennas of the electronic device 100, in steps 450 and 452. The data is of the single service flow as described above, and the service flow is provided to the electronic device through separate bearers configured for the different beamforming antennas.

The electronic device 100 is capable of receiving the data of one service flow through the bearers established between the different beamforming antennas and different base stations.

Figure 5:
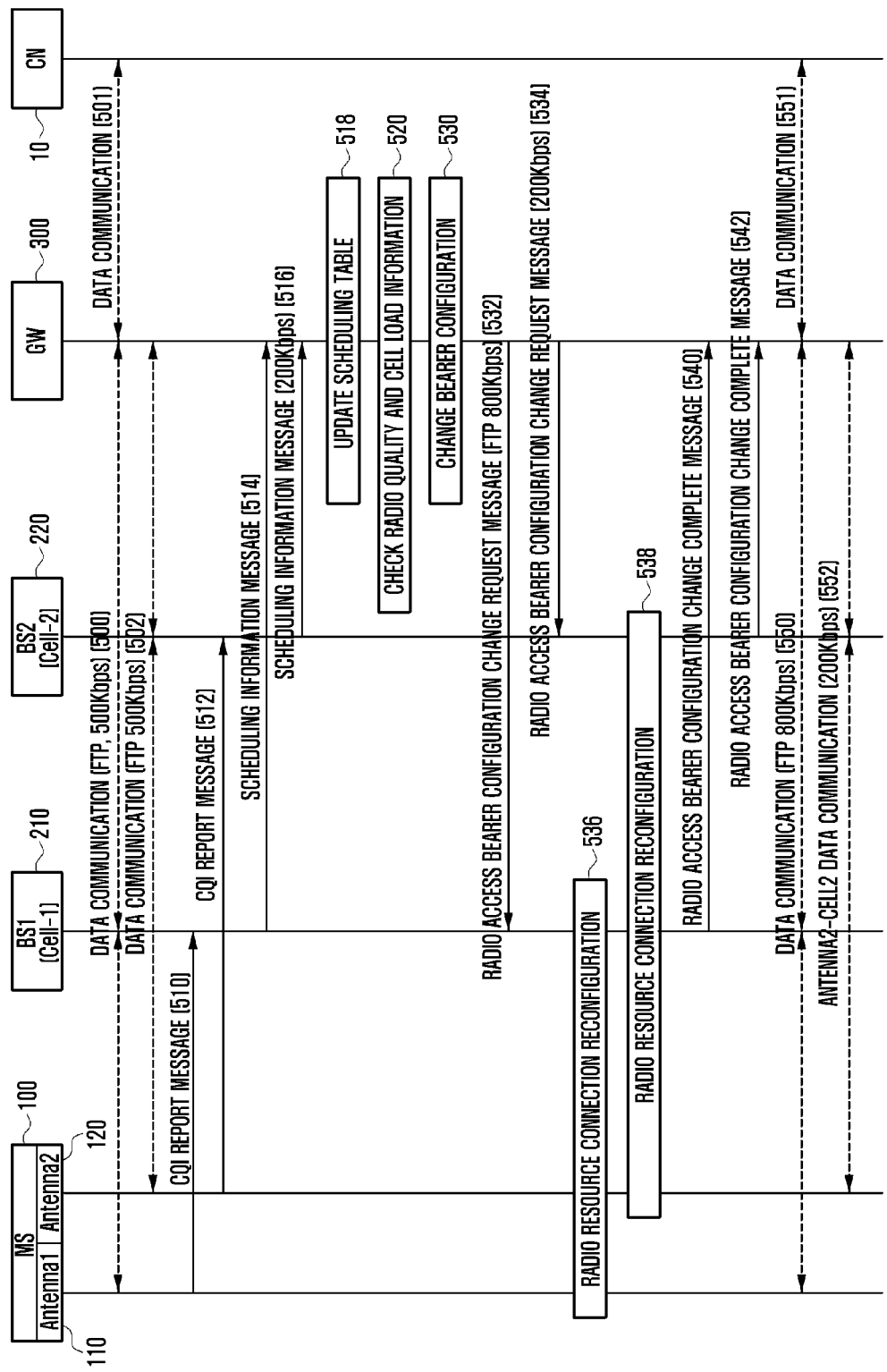
FIG. 5 is a signal flow diagram illustrating a procedure of changing the configuration of bearers dynamically based on the data rate, according to an embodiment of the present invention.

FIG. 5 is a signal flow diagram illustrating a procedure of changing the configuration of bearers dynamically based on the data rate, according to an embodiment of the present invention.

A bearer is established between the first beamforming antenna 110 of the electronic device 100 and the gateway 300 via the first base station 210, in step 500, and another bearer is established between the second beamforming antenna 120 of the electronic device 100 and the gateway 300 via the second base station 220, in step 502. It is assumed that the gateway 300 communicates data with a Correspondent Node (CN) 10 for providing a specific service flow, in step 501.

Through steps 500, 501, and 502, the electronic device 100 is receiving the data of the same service flow transmitted by the CN 10 via the first base station 210 and the gateway 300 by means of the first beamforming antenna 110, and via the second base station 220 and the gateway 300 by means of the second beamforming antenna 120.

It is assumed that the data is received at the data rate of 500 Kbps on each of the bearers established by means of the first and second beamforming antennas 110 and 120, as described with reference to FIG. 4.

The electronic device 100 provides the base stations 210 and 220 with the channel quality information measured by means of the respective antennas 110 and 120, in steps 510 and 512. If the CQIs of the bearers established by means of the first and second beamforming antennas 110 and 120 are received, the base stations 210 and 220 sends the gateway 300 the scheduling information messages including the CQIs transmitted through the first and second beamforming antennas 110 and 120 of the electronic device, in steps 514 and 516.

Then the gateway 300 updates the scheduling data information based on the CQIs of the bearers established by means of the antennas 110 and 120 of the electronic device, which are included in the scheduling information message transmitted by the respective base stations 210 and 220, in step 518. In this way, the gateway 300 updates the scheduling table information and checks the channel quality and cell load information, in step 520. This can be the procedure for the gateway 300 to check whether the data transmitted from the CN 10 to the electronic device 100 can be provided through the currently established bearers. As an example, suppose that the channel condition between the first beamforming antenna 110 of the electronic device 100 and the first base station 210 is good enough to accommodate the data rate of 500 Kbps and the channel condition between the second beamforming antenna 120 of the electronic device 100 and the second base station 220 is good enough to accommodate the data rate of 500 Kbps as well.

In this case, the gateway 300 increases the capacity of the radio bearer established between the first base station 210 and the first beamforming antenna 110 of the electronic device 100 so as to transmit more data via the first base station 210. The gateway 300 also has to control to decrease the capacity of the RB established between the second base station 220 and the second beamforming antenna 120 of the electronic device 100 so as to transmit less data via the second base station 220. It is determined whether the gateway 300 has to perform this operation, in step 520.

If it is necessary to change the data rate per bearer as a result of the determination result of step 520, the gateway 300 changes the data rates configured to the respective bearers, in step 530. For example, it may be determined to change the data rate of the radio bearer established between the first beamforming antenna 110 of the electronic device 100 and the first base station 210 for the data rate of 800 Kbps, and the data rate of the radio bearer established between the second beamforming antenna 120 of the electronic device 100 and the second base station 220 for the data rate of 200 Kbps.

If it is determined to change the data rate of the radio bearers, the gateway 300 sends a radio access bearer configuration change request message to the base stations 210 and 220, in steps 532 and 534. The radio access bearer configuration change request message may include at least one of the electronic device identifier, the service flow identifier, the service flow type, and the target data rate.

The operations of the gateway 300, which are performed in steps 520, 530, 532, and 534, are the operations that cannot be performed by the legacy gateway. In order to increase or decrease the data rate on a bearer, the legacy gateway has to receive the bearer information change request from the PCRF (not shown in FIG. 5) after the bearer has been established. According to an embodiment of the present invention, however, the gateway 300 can manage the bearers and transmit one service data flow through multiple different bearers. Accordingly, the gateway 300, according to an embodiment of the present invention, is capable of controlling to check the states of the radio bearers and change the data rate of the radio bearers based on the determination result.

If the radio access bearer configuration change request message is received from the gateway 300, each of the base stations 210 and 220 has to reconfigure the resource connection configured to the electronic device 100. As an example, suppose that the first base station 210 has received the radio access bearer configuration change request message indicating the data rate of 800 kbps for the radio bearer established between the first beamforming antenna 110 of the electronic device 100 and the first base station 210, in step 532. Also, suppose that the second base station 220 has received the radio access bearer configuration change request message indicating the data rate of 200 kbps for the radio bearer established between the second beamforming antenna 120 of the electronic device 100 and the second base station 220, in step 534.

In this case, the first base station 210 reconfigures the radio resource connection established with the first beamforming antenna 110 of the electronic device 100, in step 536. That is, the first base station 210 configures the radio resource established with the first beamforming antenna 110 of the electronic device 100 to have the data rate of 800 kbps. The second base station 220 reconfigures the radio resource connection established with the second beamforming antenna 120 of the electronic device 110, in step 538. That is, the second base station 220 configures the radio resource established with the second beamforming antenna 120 of the electronic device 100 to have the data rate of 200 kbps.

If the radio resource connection reconfiguration is completed, in step 536, the first base station 210 sends the gateway 300 a radio access bearer configuration change complete message, in step 540. If the radio resource connection reconfiguration is completed in step 538, the second base station 220 sends the gateway 300 a radio access bearer configuration change complete message, in step 542.

If the radio access bearer configuration change complete messages are received from the first and second base stations 210 and 220, in steps 536 and 538, the gateway 300 assumes that the radio bearer channels have been configured with the data rates required to the respective base stations. The gateway 300 controls to relay the data being communicated with the CN 10, in step 551, through the bearer established in step 550 with the first beamforming antenna 110 of the electronic device 100. The gateway 300 also controls to relay the data being communicated with the CN 10, in step 551, through the bearer established at step 552 with the first second beamforming antenna 120 of the electronic device 100.

Although it is depicted that the data communication between the CN 10 and the gateway 300 is performed in steps 501 and 551 discretely, the data communication between the electronic device 100 and the CN 10 may continue as far as the data to be communicated occurs. That is, it should be noted that the data communication occurs constantly, and not twice at steps 501 and 551.

As described with reference to FIG. 4, the operation (e.g. the data communication, CQI report message transmission, and radio resource connection reconfiguration) between the first beamforming antenna 110 of the electronic device 100 and the first base station 210 and the operation (the data communication, CQI report message transmission, and radio resource connection reconfiguration) between the second beamforming antenna 120 of the electronic device 100 and the second base station 220 may be performed in a different order. For example, the data communication between the second beamforming antenna 120 of the electronic device 100 and the second base station 220 may precede the data communication between the first beamforming antenna 110 of the electronic device 100 and the first base station 210. Also, the CQI report message transmission from the second beamforming antenna 120 of the electronic device 100 to the second base station 220 may precede the CQI report message transmission from the first beamforming antenna 110 of the electronic device 100 to the first base station 210.

As described above, the gateway 300 may adaptively determine the traffic transmission based on the CQI report messages from the base stations 210 and 220 having the bearers established with the respective beamforming antennas 110 and 120 of the electronic device 100. In this way, the gateway 300 is capable of controlling traffic transmission in adaptation to the radio channel conditions so as to achieve the optimal through put of the electronic device 100.

Figure 6:
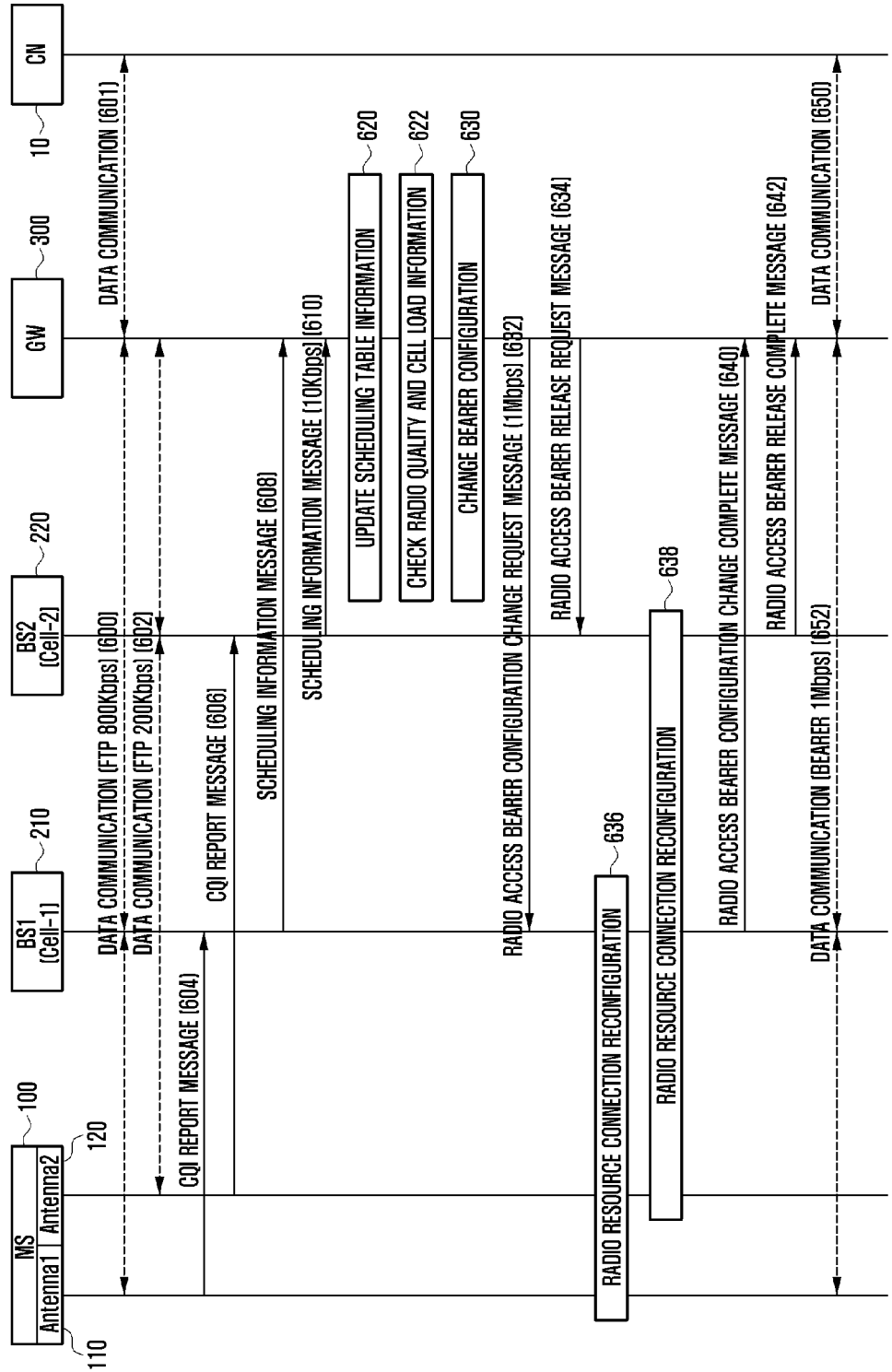
FIG. 6 is a signal flow diagram illustrating a procedure of changing bearer configuration and releasing the bearer based on the data rate, according to an embodiment of the present invention.

FIG. 6 is a signal flow diagram illustrating a procedure of changing bearer configuration and releasing the bearer based on the data rate, according to an embodiment of the present invention.

The description of the procedure of FIG. 6 is made in association with the procedure of FIG. 5. That is, it is assumed that the FTP traffic is transmitted/received on the radio bearer established between the first beamforming antenna 110 of the electronic device 100 and the first base station 210 at the data rate of 800 Kbps and on the radio bearer established between the second beamforming antenna 120 of the electronic device 100 and the second base station 220 at the data rate of 200 Kbps.

The electronic device 100 is in the state of transmitting/receiving the FTP traffic at the data rate of 800 Kbps through the radio bearer established between the first beamforming antenna 110 and the first base station 210 and the bearer established between the first base station 210 and the gateway 300. The electronic device 100 is also in the state of transmitting/receiving the ftp traffic at the data rate of 200 Kbps through the radio bearer established between the second beamforming antenna 120 and the second base station 220 and the bearer established between the second base station 220 and the gateway 300.

Although shown in the order of step 600 followed by step 602, the steps can be performed simultaneously or in a different order. Although the gateway 300 and the CN 10 continue data communication since step 601, it is depicted that the data communication between gateway 300 and the CN 10 occurs at step 601 and 650 discretely for explanation convenience.

The electronic device 100 measures channel quality on the connection to the first base station 210, which is established by means of the first beamforming antenna 110, and sends the CQI generated based on the measurement result to the first base station 210, in step 604. The electronic device 100 also measures channel quality on the connection to the second base station 220, which is established by means of the second beamforming antenna 120, and sends the CQI generated based on the measurement result to the second base station 220, in step 604.

The CQI of the radio bearer established between the first beamforming antenna 110 of the electronic device 100 and the first base station 210 may indicate a very good condition, while the CQI of the radio bearer established between the second beamforming antenna 120 of the electronic device 100 and the second base station 220 may indicate a very poor condition. For example, the CQI of the radio bearer established between the first beamforming antenna 110 of the electronic device 100 and the first base station 210 is set to a value indicating the channel quality is good enough or better to support the data rate of 800 Kbps. Also, the CQI of the radio bearer established between the second beamforming antenna 120 of the electronic device 100 and the second base station 220 is set to a value indicating the channel quality is not able to support the data rate of 200 Kbps, but to tolerate a very poor channel condition allowing at most 10 kbps or 20 kbps. In such a state, it may be determined that data transmission is impossible.

If the CQI of the radio resource allocated to the first beamforming antenna 110 of the electronic device 100 is received, the first base station 210 sends the gateway 300 a scheduling information message including the CQI, in step 608. Also, if the CQI of the radio resource allocated to the second beamforming antenna 120 of the electronic device 100 is received, the second base station 220 sends the gateway 300 a scheduling information message including the CQI, in step 610.

Steps 604 and 606 may be performed in the order as depicted in FIG. 6, simultaneously, or in the reverse order. Also, steps 608 and 610 may be performed in the order as depicted in FIG. 6, simultaneously, or in the reverse order.

If the scheduling information messages are received from the base stations 210 and 220, in steps 608 and 610, the gateway 300 updates the scheduling table information based on the received scheduling information messages, in step 620. The gateway 300 may update the scheduling table information periodically at a predetermined interval or when radio resource allocation necessity occurs between the base station and the electronic device.

After updating the scheduling table, in step 620, the gateway 300 checks the channel quality and the cell load on the radio bearers established between the electronic device 100 and the respective base stations 210 and 220, in step 622. The gateway 300 may check the necessity of bearer configuration change of the electronic device 100 in checking the channel quality and cell load of the radio bearers between the electronic device 10 and the base stations 210 and 220, in step 622. FIG. 6 is directed to an embodiment in which the gateway 300 determines whether it is necessary to change the bearer configuration based on the cell load information provided by the base stations 210 and 220.

FIG. 6 is also directed to a situation requiring release of a specific radio bearer. For example, if the condition of the radio bearer established between the first beamforming antenna 110 of the electronic device 100 and the first base station 210 is good, while the condition of the radio bearer established between the second beamforming antenna 120 of the electronic device 100 and the second base station 220 is very poor, the radio bearer established between the second beamforming antenna 120 of the electronic device 100 and the second base station 220 has to be released. In another example, if the cell load of the first base station 210 with which the electronic device 100 has established a radio bearer by means of its first beamforming antenna 110 is low, while the cell load of the second base station 220 with which the electronic device 100 has established a radio bearer by means of the second beamforming antenna 120 is high, the radio bearer established between the second beamforming antenna 120 of the electronic device 100 and the second base station 220 has to be released.

In contrast, if the condition of the radio bearer established between the first beamforming antenna 110 of the electronic device 100 and the first base station 210 is bad or the cell load of the first base station 210 is high, while the condition of the radio bearer established between the second beamforming antenna 120 of the electronic device 100 and the second base station 220 is good or the cell load of the second base station 220 is low, the radio bearer established between the first beamforming antenna 110 of the electronic device 100 and the first base station 210 has to be released.

If it is required to release a specific bearer for any of the above-described reasons, the gateway 300 generates a bearer configuration change message in step 630. In the case that multiple radio bearers have been configured through at least two base stations for one service flow, the bearer configuration change message is generated per base station. FIG. 6 is directed to the case of releasing the radio bearer established between the second beamforming antenna 120 of the electronic device 100 and the second base station 220.

The gateway 300 sends the first base station 210 a radio access bearer configuration change request message, in step 632, and sends the second base station 220 a radio access bearer release request message, in step 634. The radio access bearer configuration change request message transmitted from the gateway 300 to the first base station 210 may be a message requesting for increase of the data rate of the radio bearer because the radio access bearer release request message is transmitted to the second base station 220.

As an example, suppose that one service flow requiring 1 Mbps is provided through the two base stations 210 and 220, the first base station 210 establishing the radio bearer supporting the data rate of 800 kbps with the first beamforming antenna 110 of the electronic device 100 and the second base station 220 establishing the radio bearer supporting the data rate of 200 kbps with the second beamforming antenna 120 of the electronic device 100. In this case, the radio access bearer configuration change request message transmitted from the gateway 300 to the first base station 210 in step 632 may be the message of requesting to set the data rate of the radio bearer to 1 Mbps.

It is preferable for the gateway 300 to transmit the radio access bearer configuration change request message in step 632 and the radio access bearer release request message in step 634 at different timings, as shown in FIG. 6. This is to secure the time for allocating an additional radio bearer to the first base station 210 by transmitting the radio access bearer configuration change request message to the first base station 210 first. However, it is also possible for the gateway 300 to perform steps 632 and 634 simultaneously.

If the radio access bearer configuration change request message is received, in step 632, the first base station 210 reconfigures the radio resource connection with the first beamforming antenna 110 of the electronic device 100, in step 636. For example, the first base station 210 may reconfigure the radio bearer so as to support the FTP service blow at the data rate of 1 Mbps, in step 632.

If the radio access bearer release request message is received, in step 634, the second base station 220 reconfigures the radio resource connection with the second beamforming antenna 120 of the electronic device 100, in step 638. This is the case that, in the state that the radio bearer supporting the data rate of 200 kbps has been established between the second antenna 120 of the electronic device 100 and the second base station 220, the load of the second base station 220 increases abruptly or the channel condition between the second antenna 120 of the electronic device 100 and the second base station becomes worse so as to be impossible to support even the data rate of 200 kbps. Accordingly, the second base station 220 performs the radio resource connection reconfiguration operation for releasing the allocated radio bearer, in step 638.

If the radio bearer is reconfigured completely to increase the data rate between the first base station 210 and the first beamforming antenna 110 of the electronic device 100, in step 636, the first base station 210 sends the gateway 300 a radio access bearer configuration change complete message, in step 640.

If the radio bearer is released to stop data transmission between the second base station 220 and the second beamforming antenna 120 of the electronic device 100, in step 638, the second base station 220 sends the gateway 300 a radio access bearer release complete message, in step 642.

If the radio access bearer configuration change complete message and the radio access bearer release complete message are received, in steps 640 and 642, the gateway 300 relays the data being communicated with the CN 10, in step 650 through the bearer established between the first base station 210 and the first beamforming antenna 110 of the electronic device 100, in step 652.

Figure 7:
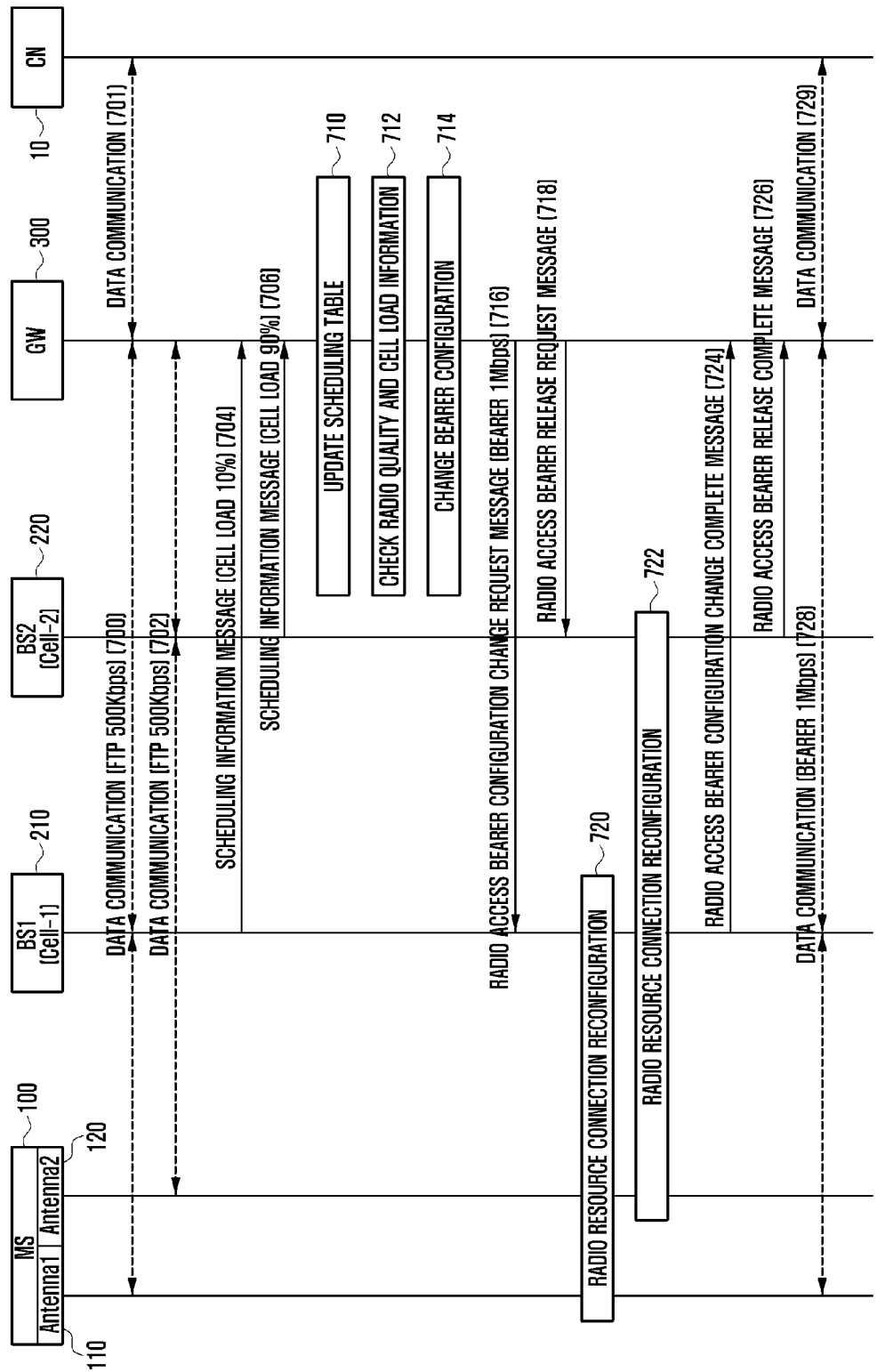
FIG. 7 is a signal flow diagram illustrating a procedure of changing the bearer configuration dynamically based on the cell load level, according to an embodiment of the present invention.

FIG. 7 is a signal flow diagram illustrating a procedure of changing the bearer configuration dynamically based on the cell load level, according to an embodiment of the present invention.

The description of the procedure of FIG. 7 is made in association with the procedure of FIG. 4. That is, it is assumed that the FTP traffic is transmitted/received on the radio bearer established between the first beamforming antenna 110 of the electronic device 100 and the first base station 210 at the data rate of 500 Kbps, and on the radio bearer established between the second beamforming antenna 120 of the electronic device 100 and the second base station 220 at the data rate of 500 Kbps.

The electronic device 100 is in the state of transmitting/receiving the FTP traffic at the data rate of 500 Kbps through the radio bearer established between the first beamforming antenna 110 and the first base station 210, and the bearer established between the first base station 210 and the gateway 300. The electronic device 100 is also in the state of transmitting/receiving the FTP traffic at the data rate of 500 Kbps through the radio bearer established between the second beamforming antenna 120 and the second base station 220, and the bearer established between the second base station 220 and the gateway 300.

Although shown in the order of step 700 followed by step 702, the steps can be performed simultaneously or in a different order. Although the gateway 300 and the CN 10 continue data communication since step 701, it is depicted that the data communication between gateway 300 and the CN 10 occurs discretely, for convenience of explanation.

The first base station 210 measures the load level of the cell periodically at a predetermined interval and, if the cell load is higher than a predetermined threshold, sends the gateway 300 the scheduling information message including the information on the cell load level, in step 704.

Also, the first base station 220 measures the load level of the cell periodically at a predetermined interval and, if the cell load is higher than a predetermined threshold, sends the gateway 300 the scheduling information message including the information on the cell load level, in step 706. Although steps 704 and 706 are shown in a specific order, the ordering is not limited thereto. FIG. 7 is directed to the case where the first base station 210 notifies the gateway 300 of the cell load level of 10%, in step 704, and the second base station 220 notifies the gateway 300 of the cell load level of 90%, in step 706.

If the scheduling information messages are received from the base stations 210 and 220, in steps 704 and 706, the gateway 300 updates the scheduling table information based on the received scheduling information messages, in step 710. After updating the scheduling table in step 710, the gateway 300 checks the channel quality and cell load on the radio bearer established between the electronic device 100 and the base stations 210 and 220, in step 712. In the embodiment of FIG. 7, this may include checking the load level of the base station and, through this, the gateway 300 may determine whether it is necessary to reallocate radio resource between the base stations and the electronic device.

The gateway 300 determines whether to change the bearer configuration of the electronic device 100, which is in communication with the base stations 210 and 220 based on the updated scheduling table, in step 714. At this time, by taking notice of the cell load level of 10% at the first base station 210 and 90% at the second base station 220, it is necessary to release the radio bearer allocated to the second base station 220 such that data which has been received through the first base station 210 is carried through the radio bearer established with the second base station 220.

The gateway 300 sends the first base station 210 a radio access bearer configuration change request message instructing to reconfigure the bearer to support the data rate of 1 Mbps, in step 716. The gateway 300 also sends the second base station 220 a radio access bearer release request message, in step 718.

It is preferable for the gateway 300 to transmit the radio access bearer configuration change request message of step 716 and the radio access bearer release request message of step 718 at different times, as shown in FIG. 7. This is to secure the time for allocating additional radio bearer to the first base station 210 by transmitting the radio access bearer configuration change request message to the first base station 210 first. However, it is also possible for the gateway 300 to perform steps 716 and 718 simultaneously.

If the radio access bearer configuration change request message is received in step 716, the first base station 210 reconfigures the radio resource connection with the first beamforming antenna 110 of the electronic device 100, in step 720. For example, the first base station 210 may reconfigure the radio bearer so as to support the FTP service blow at the data rate of 1 Mbps, in step 720.

If the radio access bearer release request message is received in step 718, the second base station 220 reconfigures the radio resource connection with the second beamforming antenna 120 of the electronic device 100, in step 722. This is the case whereby, in the state that the radio bearer supporting the data rate of 500 kbps has been established between the second antenna 120 of the electronic device 100 and the second base station 220, the load of the second base station 220 increases abruptly so as to be impossible to support even the data rate of 200 kbps. Accordingly, the second base station 220 performs the radio resource connection reconfiguration operation for releasing the allocated radio bearer, in step 722.

If the radio bearer is reconfigured completely to increase the data rate between the first base station 210 and the first beamforming antenna 110 of the electronic device 100, in step 720, the first base station 210 sends the gateway 300 a radio access bearer configuration change complete message, in step 724.

If the radio bearer is released to stop data transmission between the second base station 220 and the second beamforming antenna 120 of the electronic device 100, in step 722, the second base station 220 sends the gateway 300 a radio access bearer release complete message, in step 726.

If the radio access bearer configuration change complete message and the radio access bearer release complete message are received in steps 724 and 726, the gateway 300 relays the data being communicated with the CN 10, in step 729 through the bearer established between the first base station 210 and the first beamforming antenna 110 of the electronic device 100, in step 728.

Figure 8:
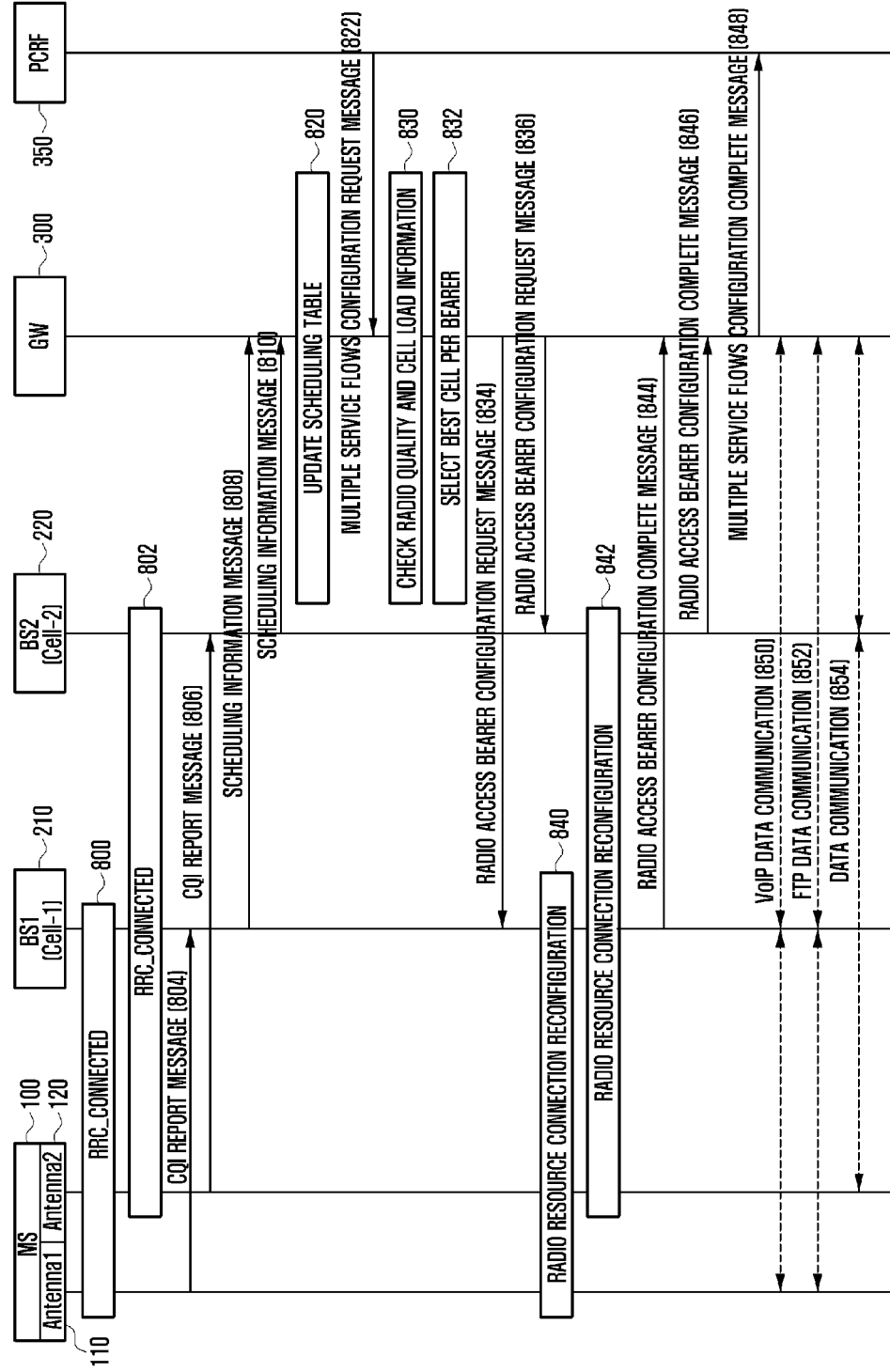
FIG. 8 is a signal flow diagram illustrating a procedure of configuring multiple bearers using the best cell in response to a multiple service flow configuration request, according to an embodiment of the present invention.

FIG. 8 is a signal flow diagram illustrating a procedure of configuring multiple bearers using the best cell in response to a multiple service flow configuration request, according to an embodiment of the present invention.

The electronic device having a plurality of beamforming antennas measures the signal strength of the neighboring base stations by means of the respective beamforming antennas, and selects the best base stations associated with the respective beamforming antennas to allocate radio resources thereto.

In FIG. 8, the first base station 210 is selected as the base station in association with the first beamforming antenna 110 of the electronic device 100, and thus, allocates radio resource between the first beamforming antenna 110 and the first base station 210 such that electronic device 100 is in the Radio Resource Control (RRC) Connected state, in step 800. Also, the second base station 220 is selected as the base station in association with the second beamforming antenna 120 of the electronic device 100, and thus, allocates radio resource between the second beamforming antenna 110 and the second base station 220 such that electronic device 100 is in the Radio Resource Control (RRC) Connected state, in step 802.

The electronic device 100 measures the channel quality on the channel established with the first base station 210 by means of the first beamforming antenna 110 and sends the first base station 210 the CQI generated based on the measurement result, in step 804. The electronic device 100 also measures the channel quality on the channel established with the second base station 220 by means of the second beamforming antenna 120 and sends the second base station 220 the CQI generated based on the measurement result, in step 806.

If the CQI on radio resource allocated for the first beamforming antenna 110 of the electronic device 100 is received, the first base station 210 sends the gateway 300 a scheduling information message including the CQI, in step 808. Also, if the CQI on radio resource allocated for the second beamforming antenna 120 of the electronic device 100 is received, the second base station 220 sends the gateway 300 a scheduling information message including the CQI, in step 810.

Steps 800 and 802, steps 804 and 805, and steps 808 and 810 may be performed in the order as shown in FIG. 8, simultaneously, or in the reverse order.

If the scheduling information messages are received from the base stations 210 and 220, in steps 808 and 810, the gateway 300 updates the scheduling table information based on the received scheduling information messages, in step

820. The scheduling table is described in more detail later with reference to the block diagram of the gateway. The scheduling table update may be performed periodically at a predetermined interval or when it is necessary to allocate radio resource between the base station and the electronic device.

The gateway 300 may receive a multiple service flows configuration request message for a specific electronic device from the PCRF 350, in step 822. The PCRF 350 may request the gateway for the service quality about single service flow. As an example, suppose that the VoIP service as the first service flow and the FTP service as the second service flow to the electronic device 100 are requested. Although FIG. 8 is directed to the case where the first and second service flows are different from each other in format, the first and second service flows can be identical with each other in format, i.e. FTP service format.

If the multiple service flows configuration request message is received in step 822, the gateway checks the scheduling tables of the connected base stations, i.e., the first and second base stations 210 and 220, in step 830. Through this, the gateway 300 checks the channel quality and cell load information of the base stations 210 and 220 to which the electronic device 100 is connected.

After acquiring the channel quality and cell load information on the base stations 210 and 220 to which the electronic device 100 is connected, the gateway 300 selects the per-bearer best cells and allocates bearers to the selected best cells, in step 832. The gateway 300 may sort the bearers by service flow and allocate two more services to a specific bearer and the rest services to the other bearers. The gateway 300 also may allocate bearers for the service flows in consideration of the priorities and required service qualities of the services. In the case of the delay sensitive service, such as VoIP, the service quality may be determined differently depending of base station through which the service is provided. Accordingly, in the case of the delay sensitive service, it is necessary to select the base station capable of guaranteeing the service quality required for the delay sensitive service as the best base station.

In FIG. 8, the VoIP service flow is requested as the first service flow, and the FTP service flow is requested as the second service flow as aforementioned. The gateway 300 may assign the VoIP service flow as the first service flow to one bearer and the FTP service flow as the second service flow on the other bearer, in step 832. As shown in FIG. 8, it is also possible to assign the VoIP service flow as the first service flow and the FTP service flow as the second service flow to one bearer and part of the FTP service flow as the second service flow on the other bearer to carry the data amount left after the previous bearer assignment.

In the following descriptions, the bearer configured by the first base station is referred to as 'first bearer,' and the bearer configured by the second base station is referred to as 'second bearer.' FIG. 8 is directed to the case where the VoIP service flow as the first service flow and part of the FTP service flow as the second service flow are assigned to the first bearer and the data amount left of the FTP service flow as the second service flows which has been left after being assigned to the first bearer is assigned to the second bearer.

As described above, different service flows are assigned to the different bearers, the gateway 300 generates the radio access bearer configuration request messages to the base stations 210 and 220 for the service flows through the allocated bearers, in step 832, and transmits the radio access bearer configuration request messages to the corresponding base stations 210 and 220, in steps 834 and 836. If the second service flow is split to be assigned to different bearers, the bearers may be configured to carry the data in equal or different amounts. Accordingly, the gateway 300 has to determine the data rates of the second service flow on the respective bearers and notifies the base stations 210 and 220 of the per-bearer data rates. The gateway 300 also has to send the first base station 210 the information requesting to provide the VoIP service and FTP service.

The first and second base stations 210 and 220 reconfigure the radio resource connection to the first and second beamforming antennas 110 and 120 of the electronic device 100, in steps 840 and 842. The first base station 210 has to configure the bearer for providing the first service flow and the bearer for providing part of the second service flow with the first beamforming antenna 110 simultaneously, in step 840. The second base station 220 configures the bearer for providing the rest part of the second service flow with the second beamforming antenna 120, in step 842.

Once the bearer configuration is complete, the base stations 210 and 220 send the gateway 300 the radio access bearer configuration completed message, in steps 844 and 846, respectively. For example, the first base station 210 notifies the gateway 300 of the bearer configuration for the VoIP service and the FTP service, and the second base station 220 notifies the gateway 300 of the bearer configuration for the FTP service. If the radio access bearer configuration complete messages for both the services are received, the gateway 300 sends the PCRF 350 a flow configuration complete message, in step 848.

The gateway 300 provides the VoIP service through the bearer established between the first base station 210 and the first beamforming antenna 110 of the electronic device 100, in step 850. The gateway 300 also provides part of the FTP service through the bearer established between the first base station 210 and the first beamforming antenna 110 of the electronic device 100, in step 852, and the remaining part of the FTP service through the bearer established between the second base station 220 and the second beamforming antenna 120 of the electronic device 100, in step 854.

In this way, the electronic device 100 is capable of receiving the VoIP service through the bearer established with the first base station 210 and the FTP service through the bearers established respectively with the first and second base stations 210 and 220.

Figure 9:
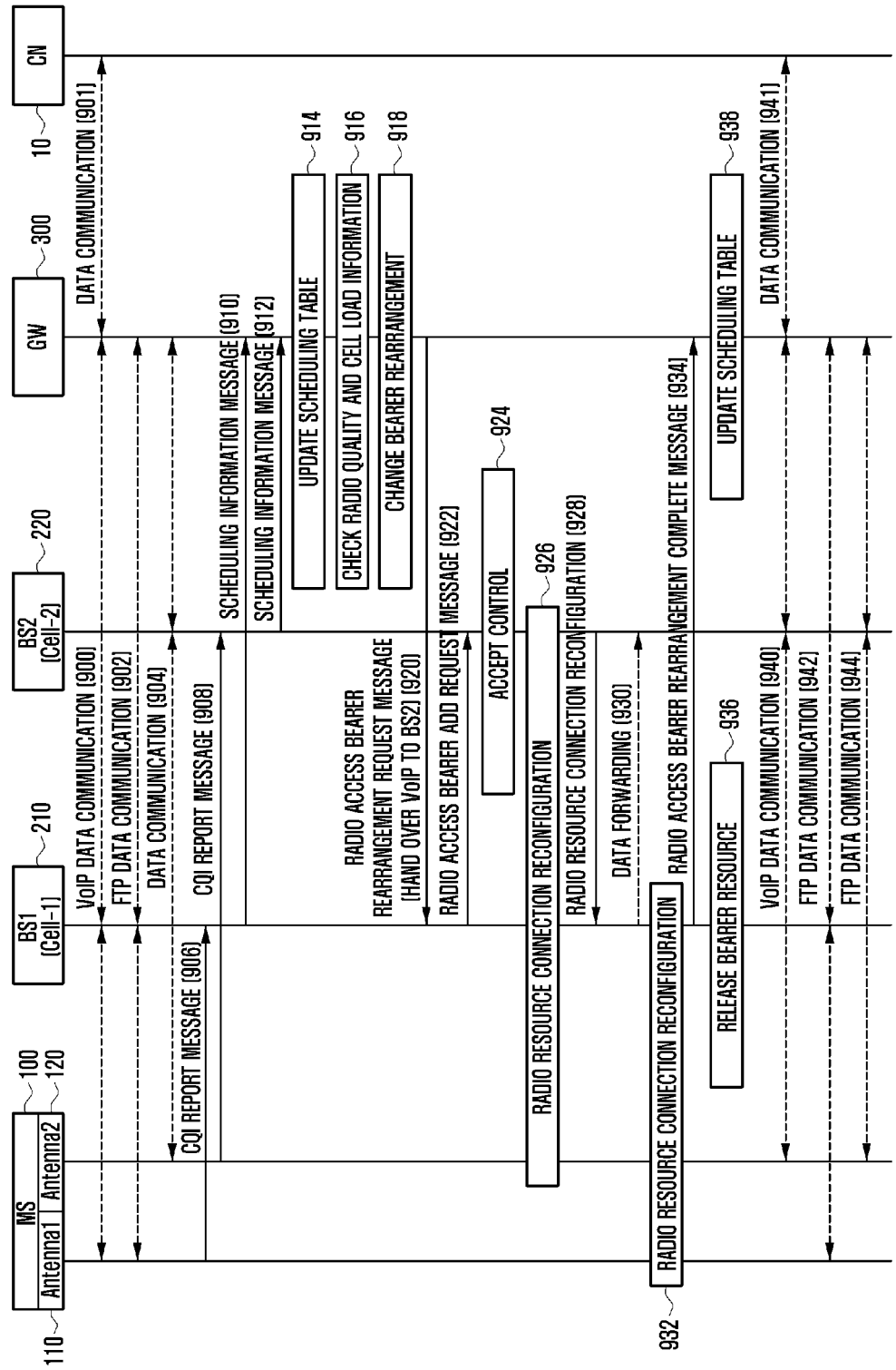
FIG. 9 is a signal flow diagram illustrating a procedure of rearranging the bearers in the state that multiple bearers are allocated for multiple data services, according to an embodiment of the present invention.

FIG. 9 is a signal flow diagram illustrating a procedure of rearranging the bearers in the state that multiple bearers are allocated for multiple data services, according to an embodiment of the present invention.

The description of the procedure of FIG. 9 is made under the assumption of the situation of FIG. 8. That is, the electronic device 100 receives the VoIP service through the bearer established with the first base station 210 and the FTP service through the bearers established respectively with the first and second base stations 210 and 220. The electronic device 100 is in the state connected to the gateway 300 through the bearer established with the first base station 210 for the VoIP service by means of the first beamforming antenna 110, in step 900, through the bearer established with the first base station 210 by means of the first beamforming antenna 110 for part of the FTP service, in step 902, and through the bearer established with the second base station 220 by means of the second beamforming antenna 120 for the rest part of the FTP service, in step 904.

The gateway 300 and the Correspondent Node (CN) 10 are in state of performing data communication, in step 901. That is, the gateway 300 transmits data from the electronic device 100 via the first base station 210 to the CN 10 and transmits data from the CN 10 to the electronic device 100 via the first base station 210.

As described above, the electronic device 100 may transmit the CQI to the currently communicating or communication-available base station periodically at a predetermined interval or when the channel quality changes abruptly. The electronic device 100 sends the first base station 210 the CQI to report the channel measurement result on the channel established between the first beamforming antenna 110 of the electronic device 100 and the first base station 210, in step 906, and sends the second base station 220 the CQI to report the channel measurement report on the channel established between the second beamforming antenna 120 of the electronic device 100 and the second base station 220, in step 908.

If the CQIs are received from the electronic device 100, the first and second base stations 210 and 220 sends the gateway 300 the scheduling information message including the load level and channel quality information, as described above. The first and second base stations 210 and 220 may transmit the scheduling information message periodically at a predetermined interval, when the cell load level changes abruptly, or when the channel quality of the bearer established with a specific electronic device changes abruptly. The CQI transmission may be performed at least one or any combinations of the above schemes. The first base station 210 sends the gateway 300 the scheduling information message, in step 910, and the second base station 220 sends the gateway 300 the scheduling information message, in step 912.

If the scheduling information message is received from at least one of the base stations in step 910 or 912, the gateway 300 updates the scheduling table storing the cell load information per base station and channel quality state of the specific electronic device, in step 914. After updating the scheduling table, the gateway 300 checks the radio channel quality states of the electronic devices and cell load information of the respective base stations. The reason for checking the radio channel quality states and cell load information of the respective base stations is to determine whether it is necessary to reconfigure or release the bearer when the channel quality of a specific electronic device is bad or when the cell load increases abruptly.

After checking the channel quality and cell load information in step 916, the gateway 300 may determine to rearrange the bearers and generate a message to notify of the determination, in step 918. The bearer rearrangement determination for VoIP service may be made when the channel quality drops between the electronic device 100 and the first base station 210, or when the increases cell load of the first base station 210 does not fulfill the minimum delay time of the VoIP service. FIG. 9 is directed to the case where the VoIP service connected to the first base station 210 is handed over to the second base station 220 due to one of the above two causes. Accordingly, the gateway 300 generates a radio access bearer rearrangement request message to the first base station 210, in step 918, and sends the first base station 210 the radio access bearer rearrangement request message, in step 920. The radio access bearer rearrangement request message may include the information indicating the base station for providing the VoIP service.

If the radio access bearer rearrangement request message is received in step 920, the first base station checks the information included in the radio access bearer rearrangement request message. For example, the first base station 210 checks the information indicating reassignment of the VoIP service configured for the current electronic device 100 to the second base station 220. Accordingly, the first base station 210 generates the radio access bearer add request message to the second base station 220 and sends the second base station 220 the radio access bearer add request message, in step 922. The first and second base stations 210 and 220 may exchange messages through the X2 interface, as described with reference to FIG. 3. The first base station 210 maintains the radio bearer established with the electronic device 100 until a radio access bearer add complete message is received from the second base station 220.

If the radio access bearer add request message is received in step 922, the second base station 220 performs an accept control operation, in step 924. The accept control operation is of preparing for additional bearer configuration with the corresponding electronic device 100 to change the path of the VoIP service from the first base station 210 to the second base station 220. The second base station 220 performs the radio resource connection reconfiguration with the second beamforming antenna 1120 of the electronic device 100, in step 926. This may be the procedure of allocating new radio resource for VoIP service through the channel established between the second base station 220 and the second beamforming antenna 120 of the electronic device.

If the procedure of allocating new radio resource for VoIP service through the channel established between the second electronic device 220 and the second beamforming antenna 120 of the electronic device 100 has completed in step 926, the second base station 220 sends the first base station 210 a radio access bearer add complete message, in step 928. The radio access bearer add complete message may be transmitted from the second base station 220 to the first base station 210 through the X2 interface.

If the radio access bearer add complete message is received in step 928, the first base station 210 transmits to the second base station 220 the VoIP service data received from the gateway 300, in step 930. In this way, the data provided by the gateway 300 can be delivered through the radio bearer established between the second base station 220 and the electronic device 100. The first base station 210 reconfigures the radio resource connection established with the first beamforming antenna 110 of the electronic device 100, in step 932. The radio resource connection reconfiguration of step 932 may be a process of releasing the radio bearer established for the VoIP service.

After releasing the radio bearer established with the first beamforming antenna 110 of the electronic device 100, the first base station 210 sends the gateway 300 a radio access bearer rearrangement complete message, in step 934. After performing step 934, the first base station 210 releases the radio bearer resource allocated to the first beamforming antenna 110 of the electronic device 100 for the VoIP service, in step 936. The radio access bearer rearrangement complete message transmitted to the gateway 300 in step 934 may include the information indicating that the radio bearer established between the first base station 210 and the first beamforming antenna 110 of the electronic device 100 for VoIP service has been released and that the VoIP service is provided through the second base station 220. The first base station may perform step 936 prior to step 934, may release the bearer resource for the VoIP service to the electronic device 100 after transmitting the radio access bearer rearrangement complete message to the gateway 300 as shown in FIG. 9, or may perform steps 934 and 936 simultaneously.

After receiving the radio access bearer rearrangement complete message, as described above, the gateway 300 updates the scheduling table based on the radio access bearer rearrangement complete message received from the first base station 210, in step 938.

Accordingly, the gateway 300 can continue data communication with the CN 10 as denoted by reference number 941. The gateway 300 can continue data communication with the electronic device 100 for the FTP service through the bearers previously established with the first and second base station 210 and 220, in steps 942 and 944, and the data communication for the VoIP service through the bearer established newly with the second base station 220, in step 940.

Figure 10:
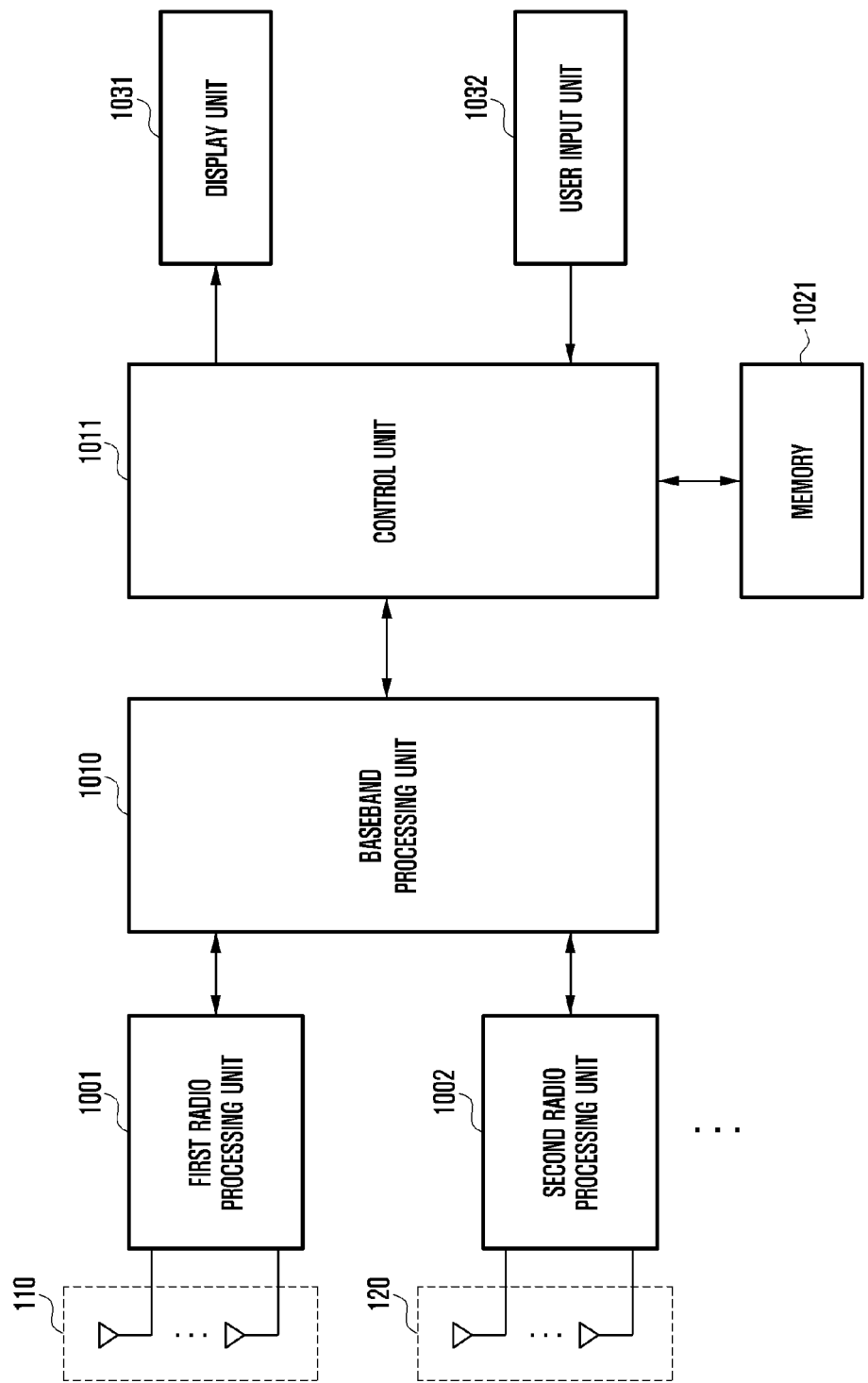
FIG. 10 is a block diagram illustrating a configuration of the electronic device capable of communicating with multiple cells or base stations simultaneously, according to an embodiment of the present invention.

FIG. 10 is a block diagram illustrating a configuration of the electronic device capable of communicating with multiple cells or base stations simultaneously, according to an embodiment of the present invention.

The first and second beamforming antennas 110 and 120 are connected to first and second radio processing units 1001 and 1002, respectively. The first radio processing unit 1001 responsible for data communication through the first beamforming antenna 110 may include a beamforming process module for tuning the beam direction of the first beamforming antenna 110. The first radio processing unit 110 up-converts the baseband signal in the analog format to the radio signal, which is multiplied with a value by the means of the beamforming process module and then radiated. The first radio processing unit 1001 also receives a high frequency beam in a specific direction by means of the beamforming process module and converts the high frequency beam to the baseband signal in the analog format. The second radio processing unit 1002 is responsible for the same operations and functions as the first radio processing unit 1001.

The baseband processing unit 1010 converts the baseband signal in the analog format to a digital format signal and outputs the digital signal to a control unit 1011, and converts the data in a digital format which is received from the control unit 1011 to the baseband signal in the analog format and outputs the baseband signal to the corresponding radio processing unit. Although one baseband processing unit 1010 is depicted in FIG. 10, the electronic device may be implemented with multiple baseband processing units. For example, the number of baseband processing units may be equal to the number of radio processing units.

The control unit 1011 is responsible for controlling overall operations of the electronic device, and particularly, in an embodiment of the present invention, may control the data communication through the bearers established with two or more base stations. The control unit 1011 may include a data processor for processing data or may operate with a modem provided separately. In FIG. 10, the function blocks are depicted separately. However, the present invention is not limited thereto but embodied by integrating the function blocks, such as a data processing unit and modem, into the control unit 1011.

A memory 1021 may include a region for storing various data necessary for operating the electronic device, and a region for storing data in response to the user request. The memory 1021 may store the control program for establishing bearers to communicate with multiple base stations. The memory 1021 may be implemented with various types of media in various forms, such as, for example, Read Only Memory (ROM), Random Access Memory (RAM), and memory stick.

A display unit 1031 is a display module for displaying the configuration and operation state of the electronic device and can be implemented with one of a Liquid Crystal Display (LCD), Light Emitting Diodes (LED), and Organic LED (OLED).

A user input unit 1032 is a module for detecting the user input and generating corresponding input signal to the control unit 1011, and can be implemented with at least one of a set of keys for receiving the user's key input, a touch pad for detecting the touch input made by the user, a hovering detector for detecting a hovering gestured made by the user within predetermined range, and an electronic pen.

It is obvious to those skilled in the art that the electronic device 100 may include additional components not shown in the drawing.

Figure 11:
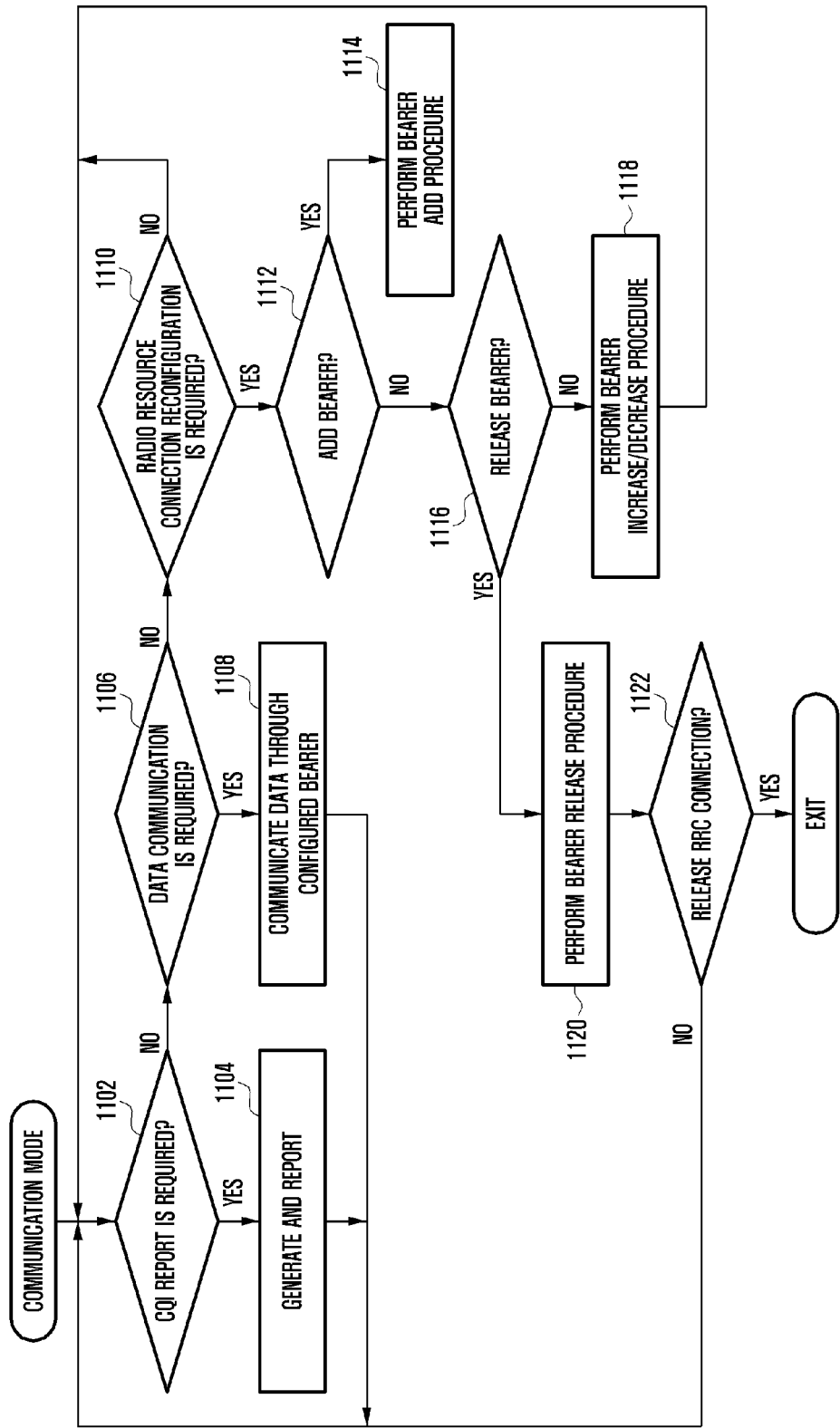
FIG. 11 is a flowchart illustrating a radio bearer management procedure of an electronic device capable of establishing bearers with two more base stations, according to an embodiment of the present invention.

FIG. 11 is a flowchart illustrating a radio bearer management procedure of an electronic device capable of establishing bearers with two more base stations, according to an embodiment of the present invention.

In FIG. 11, the communication mode may indicate the RRC connected state or a radio bearer-allocated state. In the communication mode, the control unit 1011 of the electronic device determines whether a CQI report is required, in step 1102. The CQI report can be performed in one of various ways negotiated between the base station and the electronic device. The CQI report operation will be described in greater detail below with reference to the description of the configuration of the base station.

If the CQI report is required, the control unit generates the CQI and transmits the CQI to the base station by means of a beamforming antenna, in step 1104. The CQI report may be performed by a beamforming antenna. The CQI is reported to the base station or the cell, which has the RRC connection with the beamforming antenna or which is providing data service. The CQI report process may correspond to steps 406 and 408 of FIG. 4. The CQI report process also can be performed as shown in other drawings of this Specification.

If CQI report is not required, the control unit 1011 determines whether data communication is required through a predetermined beamforming antenna, in step 1106. This step determines whether it is necessary to establish bearers to communicate data with at least one base station. If it is determined that data communication is required, the control unit 1011 controls the beamforming antenna, radio processing unit, and baseband processing unit 1010 to communicate data, in step 1108. This may correspond to step 450 and/or 452 of FIG. 4.

The control unit 1011 determines whether the radio resource connection reconfiguration request is received from a certain base station, in step 1110. The radio resource connection reconfiguration request is of requesting for radio bearer configuration for the specific service flow in the RRC connected state. The radio bearer configuration for specific service flow may be of adding a radio bearer.

If it is determined that the radio resource connection reconfiguration request is received, the control unit 1011 determines whether the radio resource connection reconfiguration request is a radio bearer add request, in step 1112. If the radio resource connection reconfiguration request is the radio bearer add request (including new connection), the control unit 1011 adds a new bearer, in step 1114. The radio bearer add process may correspond to steps 440 and 442 of FIG. 4 or step 926 of FIG. 9.

If the radio resource connection reconfiguration request is not the radio bearer add request, the control unit 1011 determines whether the radio resource connection reconfiguration request is a radio bearer release request, in step 1116. If the radio resource connection reconfiguration request is the radio bearer release request, the procedure goes to step 1120. If the radio resource connection reconfiguration request is not the radio bearer release request, the procedure goes to step 1118. As described above, since the radio resource connection reconfiguration is one of adding, increasing/decreasing, and releasing the radio bearer, if the radio resource connection reconfiguration request is not the radio bearer add request and not the radio bearer release request, the radio resource connection reconfiguration request is the radio barer increase/decrease request. Accordingly, the control unit 1011 performs the radio bearer increase process, in step 1118. This process may correspond to steps 536 and 538 of FIG. 5.

If the radio resource connection reconfiguration request is the radio bearer release request, the control unit 1011 performs the bearer release process, in step 1120. The bearer release process may correspond to step 638 of FIG. 6, step 722 of FIG. 7, and step 932 of FIG. 9. The control unit 1011 determines whether the RRC connection is released, in step 1122. If it is determined that there is any RRC connection or radio bearer established with a certain base station, the control unit 1011 repeats the routine of FIG. 11. If it is determined that all of the RRC connections with the base stations have been released, the routine of FIG. 11 ends.

Figure 12:
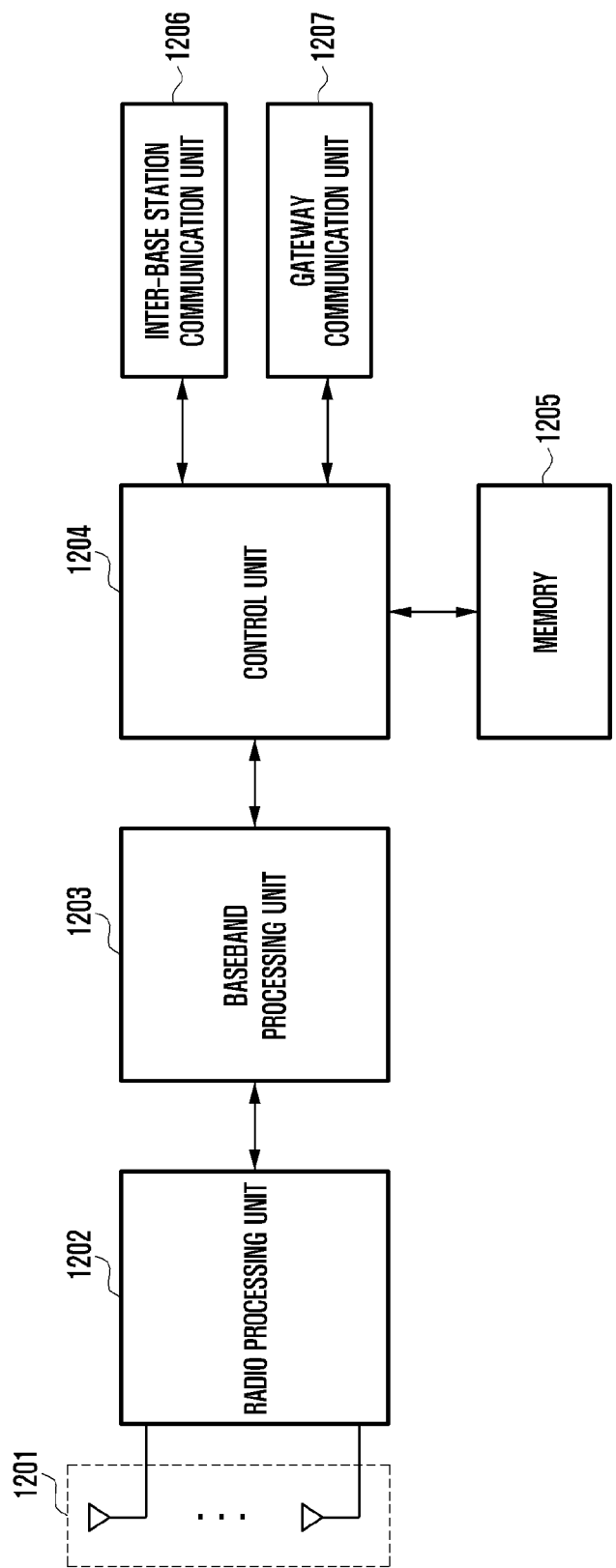
FIG. 12 is a block diagram illustrating a configuration of the base station capable of establishing a bearer with the electronic device capable of configuring bearers with two or more base stations or cells, according to an embodiment of the present invention.

FIG. 12 is a block diagram illustrating a configuration of the base station capable of establishing a bearer with the electronic device capable of configuring bearers with two or more base stations or cells, according to an embodiment of the present invention.

A beamforming antenna 1201 is implemented in the form of a beam array capable of forming a beam to an electronic device, and the base station may include the array antennas equal in number to or greater than the array antennas included in one beamforming antenna of the electronic device. A radio processing unit 1202 receives the data in the analog format, which is transmitted by the electronic device on a predetermined band by means of the beamforming antenna 1201, and converts the received signal to the baseband signal. The radio processing unit 1202 may up-convert the baseband signal to the signal of a predetermined frequency band so as to be transmitted to the electronic device by means of the beamforming antenna 1201.

A baseband processing unit 1203 converts the baseband signal from the radio processing unit 1202 to a digital signal, which is transferred to a control unit 1204. The base station processing unit 1203 also converts the digital signal from the control unit 1204 to the baseband analog signal, which is transferred to the radio processing unit 1202.

The control unit 1204 controls overall operations of the base station, monitors the radio channel between the electronic device and the base station, and manages the bearers established between the base station and the electronic devices. The control unit 1204 controls, when inter-base station communication is required, the control signal exchange with other base stations by means of an inter-base station communication unit 1206. The control unit 1204 controls the configuration, change, and release of bearers established with the gateway 300, scheduling message transmission, data communication with the electronic device through the bearers established with the electronic device.

The control unit 1204 may determine the CQI report interval with the electronic device located within the cell. The CQI report interval may be configured in advance according to one or any combination of the four schemes as follows. Descriptions are made of the CQI report interval configuration schemes hereinafter.

The first scheme is to configure the CQI transmission interval based on the channel variation rate.

The base station may configure the scheduling information transmission interval based on the channel quality variation rate of the radio bearer or RRC established with the electronic device. The base station may configure a short scheduling information transmission interval for fast channel quality variation to transmit CQI frequently and a long scheduling information transmission interval for slow channel quality variation to transmit CQI less frequently. It is possible to set the scheduling information interval based on the Transmission Time Interval (TTI) configured for data communication between the electronic device and the base station, i.e., in units of a certain number of TTIs, in units of a second, or in units of a minute for the case of the fixed electronic device or the electronic device of which channel quality varies little.

The CQI transmission interval may be configured based on the channel quality variation rate determined in consideration of the mobility of the electronic device, or the electronic device may adjust the CQI transmission interval by itself. In the case of using the mobility of the electronic device, the CQI transmission interval may be configured in adaptation to the radio channel quality, such that the scheduling information is transmitted at an interval of 4 seconds for the case of moving at a low speed of 3 Km/h~10 Km/h and at an interval of 100 ms for the case of moving at a high speed of 100 Km/h~120 Km/h.

When the electronic device controls the CQI transmission interval, if the channel quality varies fast in view of the electronic device, the electronic device may transmit CQI frequently, e.g., at an interval of 100 ms. Accordingly, the base station transmits the scheduling information generated based on the CQI to the gateway at the corresponding interval. If the channel quality varies slowly in view of the electronic device, the electronic device may transmit CQI less frequently, e.g., at an interval of 4 seconds. In this case, the base station transmits the scheduling information based on the CQI provided by the electronic device to the gateway at the corresponding interval.

The second scheme is to configure the scheduling information transmission interval to the gateway based on the data rate to the electronic device.

For example, if the data rate of the channel between the base station and the electronic device is high, the base station checks the CQI frequently to reflect the radio channel variation quickly and configures the scheduling information transmission interval based thereon to transmit the scheduling information to the gateway quickly. In contrast, if the data rate of the channel between the base station and the electronic device is low, it is tolerable to reflect the radio channel variation slowly, and thus, the base station checks the CQI sporadically or at the same interval as before and elongates the scheduling information transmission interval based thereon.

For example, the base station may set the scheduling information transmission interval in a stepwise manner, i.e., 10 seconds for the data rate of 100 Kbps or below, 4 seconds for the data rate greater than or equal to 100 Kbps and less than 500 Kbps, 1 second for the data rate greater than or equal to 500 kbps and less than 1 Mbps, and 100 ms for the data rate greater than or equal to 1 Mbps and less than 3 Mbps.

The third scheme is to determine the scheduling information transmission interval based on the load level of the base station or cell.

For example, the base station measures the load level of the base station or cell and adjusts the scheduling information transmission interval stepwise based on the load interval. For example, the base station may set the scheduling information transmission interval to 10 seconds for the load level less than 10%, 4 seconds for the load level greater than or equal to 10% and less than 30%, 1 second for the load level greater than or equal to 30% and less than 60%, and 100 ms for the load level greater than or equal to 60%.

The fourth scheme is to transmit the scheduling information at an interval preset by the operator without consideration of other items. For example, the base station transmits the scheduling information periodically at a preset interval independently of the movement speed of the electronic device, data rate between the base station and the electronic device, and load level of the base station or cell. This scheme has the least implementation complexity. However, it is preferred to set the scheduling information transmission interval to a value large enough to tolerate the change in movement speed of the electronic device, a data rate between the base station and the electronic device, and the load level of the base station or cell.

The memory 1205 may include a region for storing radio channel state information and bearer configuration information per electronic device and a region for storing data necessary for controlling the base station.

The inter-base station communication unit 1206 may communicate data and/or a signal with another base station through an interface configured for inter-base station communication, e.g. X2 interface. A gateway communication unit 1207 may provide an interface for communicating data and/or a signal with the gateway, e.g. S1 interface.

Figure 13A:
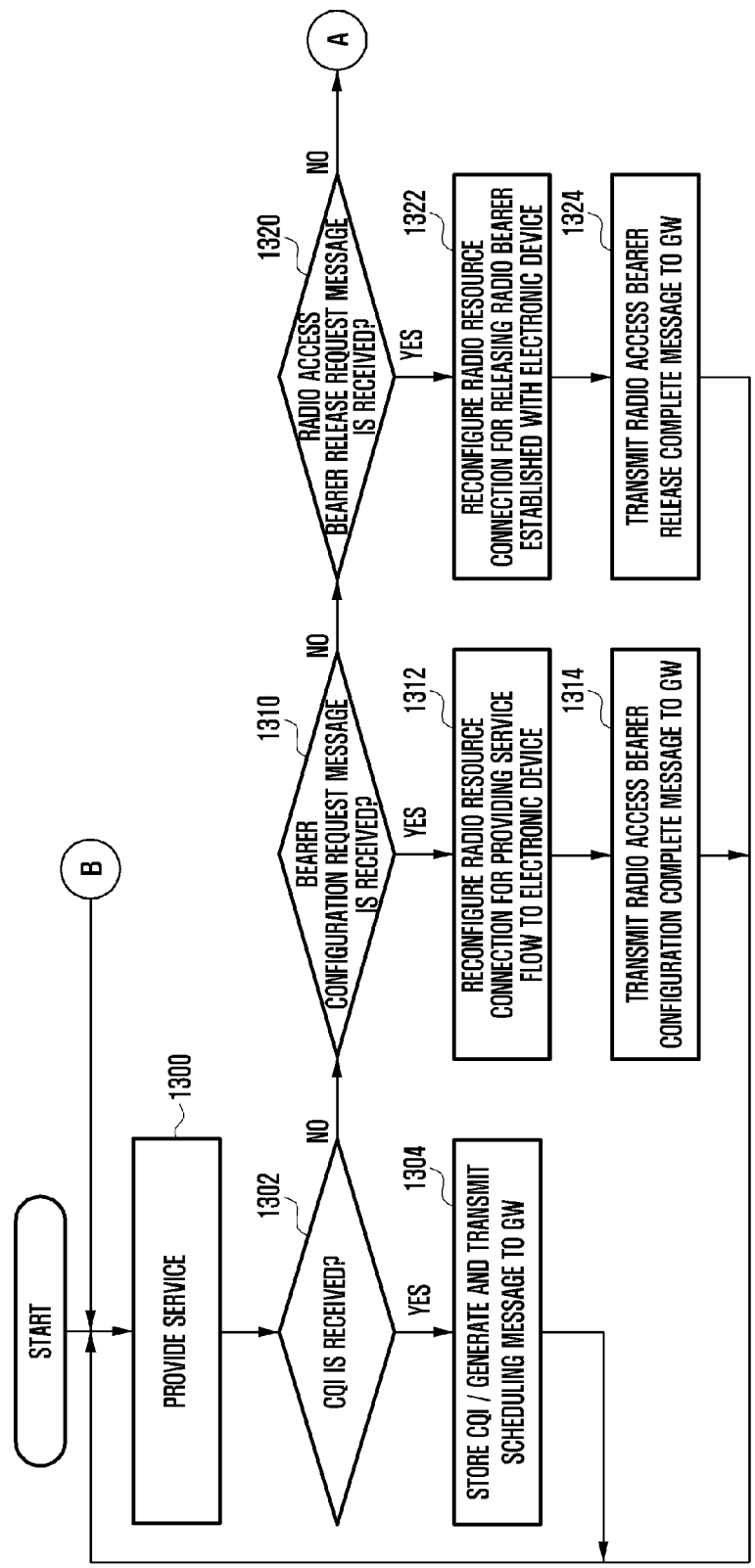
FIGS. 13A and 13B are flowcharts illustrating a bearer configuration and management procedure of a base station, according to an embodiment of the present invention.
Figure 13B:
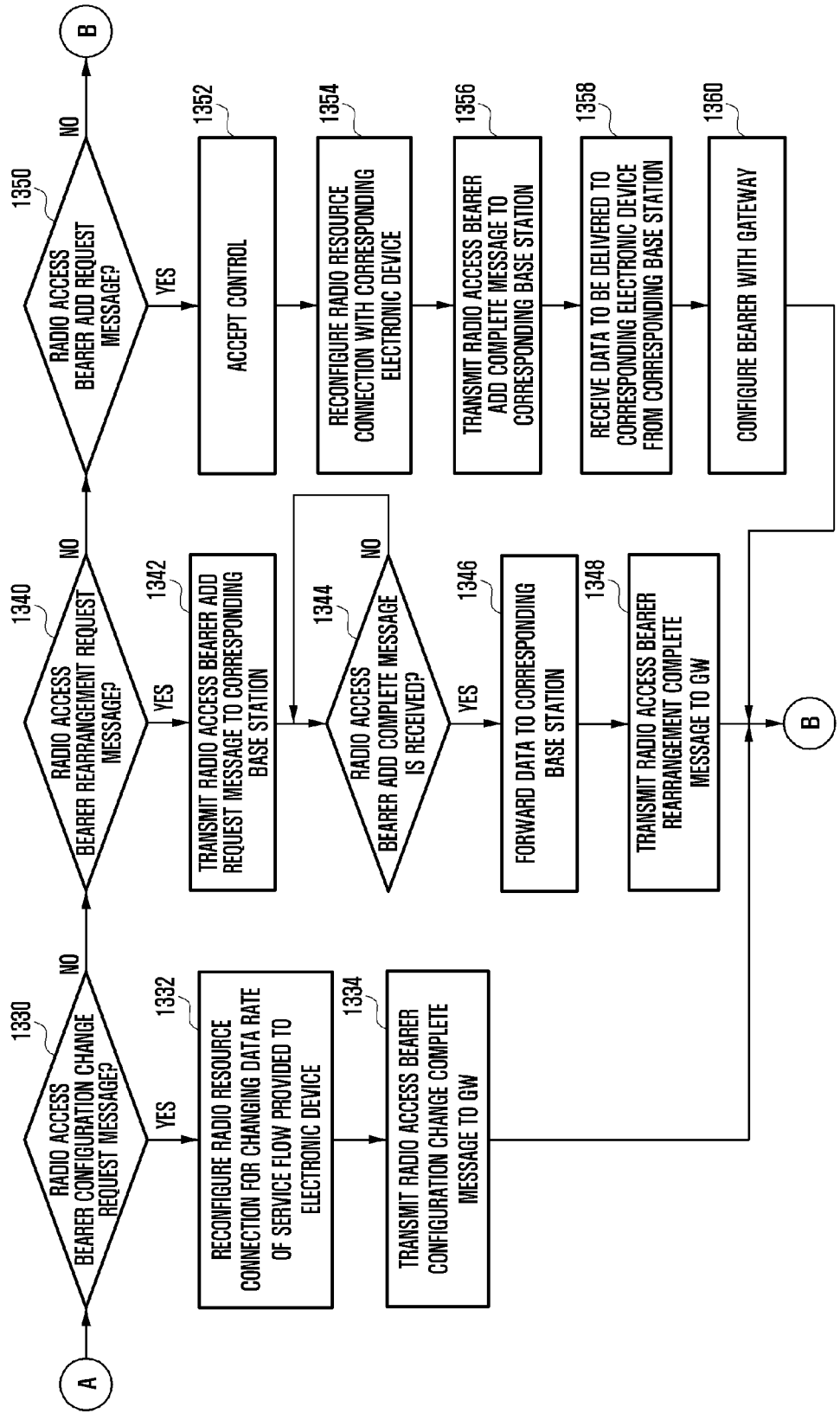

FIGS. 13A and 13B are a flowchart illustrating a bearer configuration and management procedure of a base station, according to an embodiment of the present invention.

The control unit 1204 provides the electronic device a service, in step 1300. Providing the service may include maintaining the RRC connections with the electronic devices located within the cell of the base station and communicating data with a specific electronic device. In the course of providing the electronic device with the service, the control unit 1204 determines whether a CQI is received from the electronic device, in step 1302. If a CQI is received from the electronic device, in step 1302, the control unit 1204 stores the CQI in the memory 1205 and sends the gateway 300 a scheduling information message including the CQI, in step 1304. The scheduling information message may include the aforementioned base station load information. FIG. 13A is directed to the case where the base station transmits the scheduling information message immediately upon receipt of the CQI from the electronic device. However, the base station may transmit the scheduling information message to the gateway at a predetermined interval.

The scheduling information message transmitted from the base station to the gateway may include the data rate per electronic device or load level per base station. The data rate per electronic device means the data amount serviced to the electronic device during a predetermined period, and the load level per cell or base station may be an absolute value or a relative value. The absolute value may be the value indicating underload or overload, and the relative value may be a utilization value of the Physical Resource Block (PRB).

The base station may calculate the load level of the base station or cell. A description is made of the method of calculating the per-cell load level. The PRB utilization can be calculated as in Equation (1) below.

$$\text{PRB utilization: } \rho_c = \frac{PRB^c_{used}(\Delta T)}{PRB^c_{available} \frac{(\Delta T)}{TTI}} \quad (1)$$

In Equation (1), c denotes a cell index, T denotes a time interval, $PRB^c_{used}(\Delta T)$ denotes a number of resource blocks scheduled for user data during the time interval T, TTI denotes Transmission Time Interval, and $PRB^c_{available}$ denotes a number of resource blocks available in cell c.

The cell overload determination can be made using Equation (2) below.

$$\rho_c > TH_{overload} \text{ and } \frac{\sum THP_u}{\sum GBR_u} < 1.0, u \in N_c \quad (2)$$

In Equation (2), $\rho_c$ denotes the PRB utilization value, $TH_{overload}$ denotes the PRB utilization threshold value, $THP_u$ denotes measured throughput of the bearers of the electronic device (MS) u, and $GRB_u$ denotes the Guaranteed Bit Rate (GBR) bearers of the electronic device u.

If the cell overload is determined by Equation (2), this means two elements are considered. The first element taken into consideration is the PRB utilization. The second element taken into consideration is the measured throughput of the bearers of the electronic device and the Guaranteed Bit Rate of the electronic device. Which element is considered first is not important. However, if both or one of the two conditions is not fulfilled in the case of considering the two elements, it is determined that the cell is in the overload state.

In step 1310, the control unit 1204 determines whether a bearer configuration request message is received from the gateway 300 in the course of the service. If the bearer configuration request message is received from the gateway 300, this corresponds to steps 432 and 434 of FIG. 4 and steps 834 and 836 of FIG. 8. Step 1310 may determine whether there is a request for a new service flow.

If the bearer configuration request message is received, the control unit 1204 performs a radio resource connection reconfiguration operation for providing the service flow to the electronic device 100, in step 1312. This may corresponds to the operation of configuring a radio bearer for providing a new service flow so as to perform the radio resource connection reconfiguration operation for one or more service flows. Steps 432 and 434 of FIG. 4 and step 836 of FIG. 8 may relate to the radio resource connection reconfiguration operation for one service flow, and step 834 of FIG. 8 may relate to the radio resource connection reconfiguration operation for two or more service flows. If the radio resource connection reconfiguration operation for one service flow is required, the control unit 1204 may configure a specific beamforming antenna of the electronic device 100 and one radio bearer. Otherwise if the radio resource connection reconfiguration operation for multiple service flows is required, the control unit 1204 may configure the radio bearers for the respective service flows.

As described above, if the radio access bearer configuration with the electronic device 100 is completed, the control unit 1204 generates the radio access bearer configuration complete message and transmits this message to the gateway 300 by means of the gateway communication unit 1207, in step 1314.

The control unit 1204 also determines whether a radio access bearer release request message is received from the gateway 300 through the gateway communication unit 1207 in the course of the service, in step 1320. Step 1320 may correspond to steps 634 of FIG. 6 or step 718 of FIG. 7. The radio access bearer release request message may be transmitted when the condition of the radio bearer established with the electronic device deteriorates such that it becomes impossible to provide the service, or when the load level of the base station increases such that it becomes possible to provide the service to specific electronic devices.

If the radio access bearer release request message is received from the gateway 300, the control unit 1204 performs the radio resource connection reconfiguration operation with the electronic device to which radio access bearer release is requested, in step 1322. The radio resource connection reconfiguration operation performed at step 1322 may be a result of releasing the radio bearer established with one or more electronic devices.

After performing the radio bearer release procedure, the control unit 1204 generates a radio access bearer release complete message and transmits this message to the gateway 300 by means of the gateway communication unit 1207, in step 1324. The radio access bearer release complete message may include the identifier of the electronic device of which radio bearer has been released.

Referring to FIG. 13B, the control unit 1204 determines whether a radio access bearer configuration change message is received from the gateway 300 through the gateway communication unit 1207 in the course of the service, in step 1330. Step 1330 may correspond to step 532 or 534 of FIG. 5, step 632 of FIG. 6, or step 716 of FIG. 7. Step 532 of FIG. 5, step 632 of FIG. 6, and step 716 of FIG. 7 may relate to transmitting the radio access bearer configuration change message for increasing the data rate on the bearer established between electronic device and the base station. Step 534 of FIG. 5 may relate to transmitting the radio access bearer configuration change message for decreasing the data rate on the radio bearer established between the electronic device and the base station.

Accordingly, the control unit 1204 performs the radio resource connection reconfiguration operation for changing the data rate of the service flow provided to the electronic device based on the information included in the radio access bearer configuration change request message transmitted by the gateway 300, in step 1332. For example, the control unit 1204 may perform the radio resource connection reconfiguration operation for increasing the data rate as shown in step 532 of FIG. 5, step 632 of FIG. 6, and step 716 of FIG. 7, and the radio resource connection reconfiguration operation for decreasing the data rate as shown in step 534 of FIG. 5.

If the radio resource connection reconfiguration operation is completed, the control unit 1204 sends the gateway 300 a radio access bearer configuration change complete message by means of the gateway communication unit 1207, in step 1334.

The control unit 1204 also determines whether a radio access bearer rearrangement request message is received from the gateway 300 through the gateway communication unit 1207 in the course of the service, in step 1340. The radio access bearer rearrangement request may be the request for handing over the service flow provided to the electronic device to another base station, and corresponds to step 920 of FIG. 9.

If the radio access bearer rearrangement request message is received, the control unit 1204 generates a radio access bearer add request message for handing over the service flow provided to the electronic device to the base station designated by the gateway 300, in step 1342. The control unit 1204 sends the radio access bearer add request message to the target base station by means of the inter-base station communication unit 1205.

After transmitting the radio access bearer add request message to the target base station, the control unit 1204 determines whether a radio access bearer add complete message is received from the corresponding base station, in step 1344. The control unit 1204 may wait until the radio access bearer add complete message is received or before a predetermined period expires since the transmission of the radio access bearer add request message. If the radio access bearer add complete message is received from the corresponding base station through the inter-base station communication unit 1206, in step 1344, the control unit 1204 performs step 1346.

In step 1346, the control unit 1204 forwards the data received from the gateway 300 through the gateway communication unit 1207 to the target base station. The data is addressed to the electronic device and may be stored in the memory 1205. If the data forwarding is completed, the control unit 1204 generates a radio access bearer rearrangement complete message and transmits this message to the gateway 300 by means of the gateway communication unit 1207, in step 1348.

The control unit 1204 determines whether a radio access bearer add request message is received from a neighbor base station through the inter-base station communication unit 1206 in the course of the service, in step 1350. If the radio access bearer add request message is received, this corresponds to step 924 of FIG. 9.

If the radio access bearer add request message is received, the control unit 1204 performs an accept control operation, in step 1352. Next, the control unit 1204 performs the radio resource connection reconfiguration for adding radio bearer with the electronic device, in step 1354. In the radio resource connection reconfiguration process, the control unit 1204 establishes the radio bearer supporting the data rate indicated by the radio access bearer add request message received form the neighboring base station.

If the radio access bearer is added successfully, the control unit 1204 generates a radio access bearer add complete message and transmits this message to the corresponding base station by means of the inter-base station communication unit 1206, in step 1356. After transmitting the radio access bearer add complete message, the control unit 1204 receives the data to be transmitted to the electronic device for which a new radio bearer has been added from the corresponding base station by means of the inter-base station communication unit 1206, in step 1358. If the corresponding base station has no data stored, step 1358 may be omitted.

After performing step 1356 or 1358, the control unit 1204 configures a bearer with the gateway 300 for the service flow to be provided to the electronic device by means of the gateway communication unit 1207, in step 1360.

Figure 14:
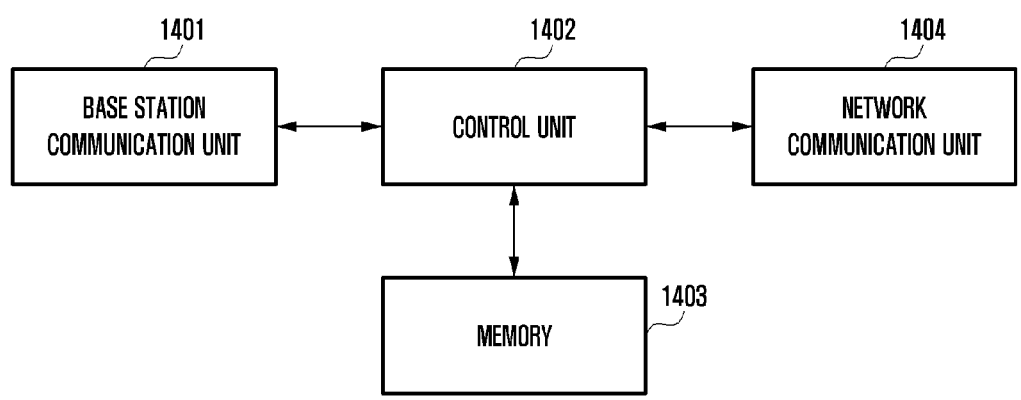
FIG. 14 is a block diagram illustrating a configuration of the gateway capable of providing an electronic device with a service flow through multiple cells, according to an embodiment of the present invention.

FIG. 14 is a block diagram illustrating a configuration of the gateway capable of providing an electronic device with a service flow through multiple cells, according to an embodiment of the present invention.

A communication unit 1401 is responsible for transmitting/receiving data and/or messages with base stations through a predetermined interface, e.g., S1 interface. The communication unit 1401 transmits data and/or a message from a control unit 1402 to the specific base station(s) and transfers the data and/or message received from the specific base station(s) to the control unit 1402.

The control unit 1402 controls overall operations for data transmission to the base stations, and checks the scheduling information from the base station to select the best cell or base station for data communication based on the scheduling information. The control unit 1402 also determines whether to use one base station (cell) or two or more base stations (cells) for providing the electronic device with the service flow. The control unit 1402 also may control establishment, release, and rearrangement of bearers. The control unit 1402 may manage the scheduling and bearer management data in the form of a table or database stored in a memory 1403.

The control unit 1402 can determine whether to use one base station (cell) or two or more base stations (cells) for providing the electronic device with the service flow using the database. If it is required to provide a specific electronic device with a specific service flow, the control unit 1402 checks the list of the cells to which the electronic device is connected and, if there is one cell, configures a single cell bearer and, otherwise if there are multiple cells, checks the type of the service flow. For the delay sensitive service, the control unit 1402 configures the signal cell bearer in consideration of the load of packet reordering for the multi-cell distributed transmission. If the service flows are of a non-real time service, the control unit 1402 determines to perform per-cell bearer configuration when the service quality (QoS) is fulfilled through the multi-cell bearer configuration in consideration of the per-cell radio quality and load level.

The memory 1403 may include a region for storing various data necessary for the operation of the control unit 1402, and a region for storing the data associated with bearer management. The service quality information may be stored in the memory 1403 in the form of a table as follows.

TABLE 1

| MS | Bearer ID | Service Class | Priority | MBR | GBR | Target Delay | Packet Error Rate | Application Type |
|---|---|---|---|---|---|---|---|---|
| MS-1 | #1 | NRT | 6 | 10 Mbps | — | — | $10^{-6}$ | FTP |
|  | #2 | RT | 2 | — | 5 Mbps | 200 ms | $10^{-3}$ | VoIP |
| MS-2 | #1 | RT | 3 | — | 1 Mbps | 150 ms | $10^{-3}$ | Video |
|  | #2 | RT | 8 | — | 3 Mbps | 50 ms | $10^{-3}$ | Gaming |

Table 1 is an example of the service quality information table. As shown in Table 1, service quality information table may include a plurality of columns including bearer identifier, service class, priority, Maximum Bit Rate (MBR), Guaranteed Bit Rate (GBR), Target Delay, Packet Error Rate, and application type. In Table 1, the bearer identifiers may indicate the bearers allocated to the same or different beamforming antennas. The service class may indicate whether the service is a Real Time (RT) service or a Non-Real time (NRT) service. The priority may be a number representing a predetermined priority, and MBR may be a maximum bit rate supported on the corresponding bearer. The GBR may be the minimum bit rate supported on the bearer allocated to the corresponding service flow, and the target delay may be the maximum allowed delay of the corresponding service flow. The packet error rate may be a tolerable error rate of the corresponding service flow, and the application type may be the type of the service flow.

The service quality information table, as exemplified by Table 1, is acquired from the PCRF and stored in the memory 1403 in the course of the service flow configuration procedure and used for bearer rearrangement or change. If a specific service flow ends, it may be deleted from the service quality information table.

Table 2 is an example of the scheduling information table.

TABLE 2

| MS | Ant. ID | BS ID | Serving Cells | Radio link Quality | Cell Load |
|---|---|---|---|---|---|
| MS-1 | 1 | BS1 | Cell-0 | 8 Mbps | 50% |
|  | 2 | BS2 | Cell-1 | 2 Mbps | 50% |
| MS-2 | 1 | BS1 | Cell-0 | 8 Mbps | 80% |
|  | 2 | BS2 | Cell-1 | 2 Mbps | 20% |

As shown in Table 2, the scheduling information table may include a plurality of columns such as device (MS) identifier, antenna identifier (Ant. ID) for bearer configuration of each electronic device, cell identifier (serving cell) of base station having antennas configured with bearers, Radio Link Quality of corresponding cell, and cell load.

The scheduling information table stored in the memory 1403 may be updated whenever a scheduling information message is received from any of the base stations. Accordingly, if it is required to provide one or more service flows to a certain electronic device, the control unit 1402 determines the base station(s) or cell(s), antenna(s) of the electronic device, and data rate(s) for the service flow(s) based on the information of Table 2.

A network communication unit 1404 provides the interface for data and message communication with the PCRF or the CN on the network. This interface may be determined differently depending on the network implementation and, there is no restriction in selecting the interface in the embodiments of the present invention. The network communication unit 1404 may convert the data or messages to be transmitted to the PCRF 350 and the data and/or messages relayed between the electronic device and the CN to appropriate formats under the control of the control unit 1402.

Figure 15A:
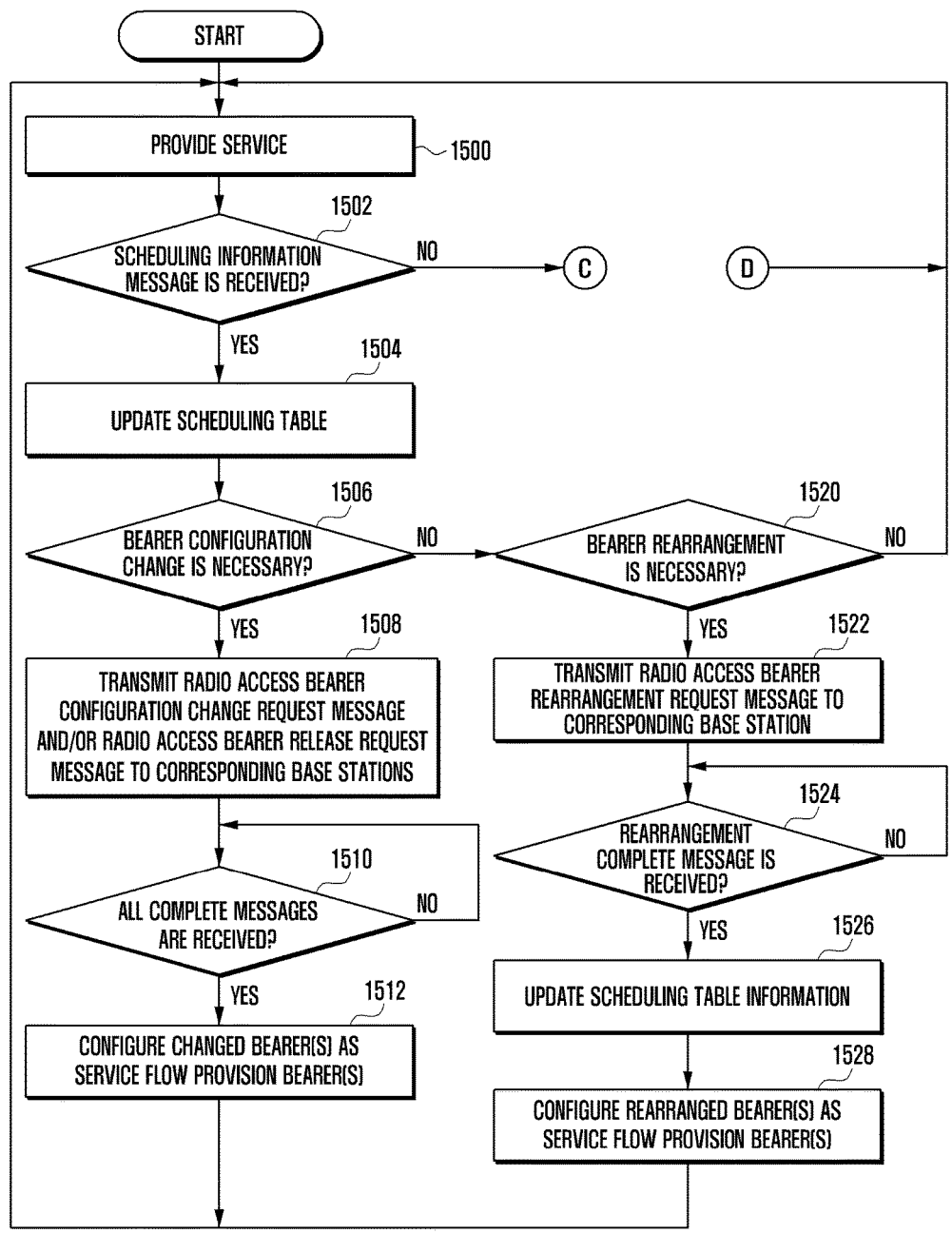
FIGS. 15A and 15B are flowcharts illustrating the bearer management procedure for a gateway to provide an electronic device with a service flow, according to an embodiment of the present invention.
Figure 15B:
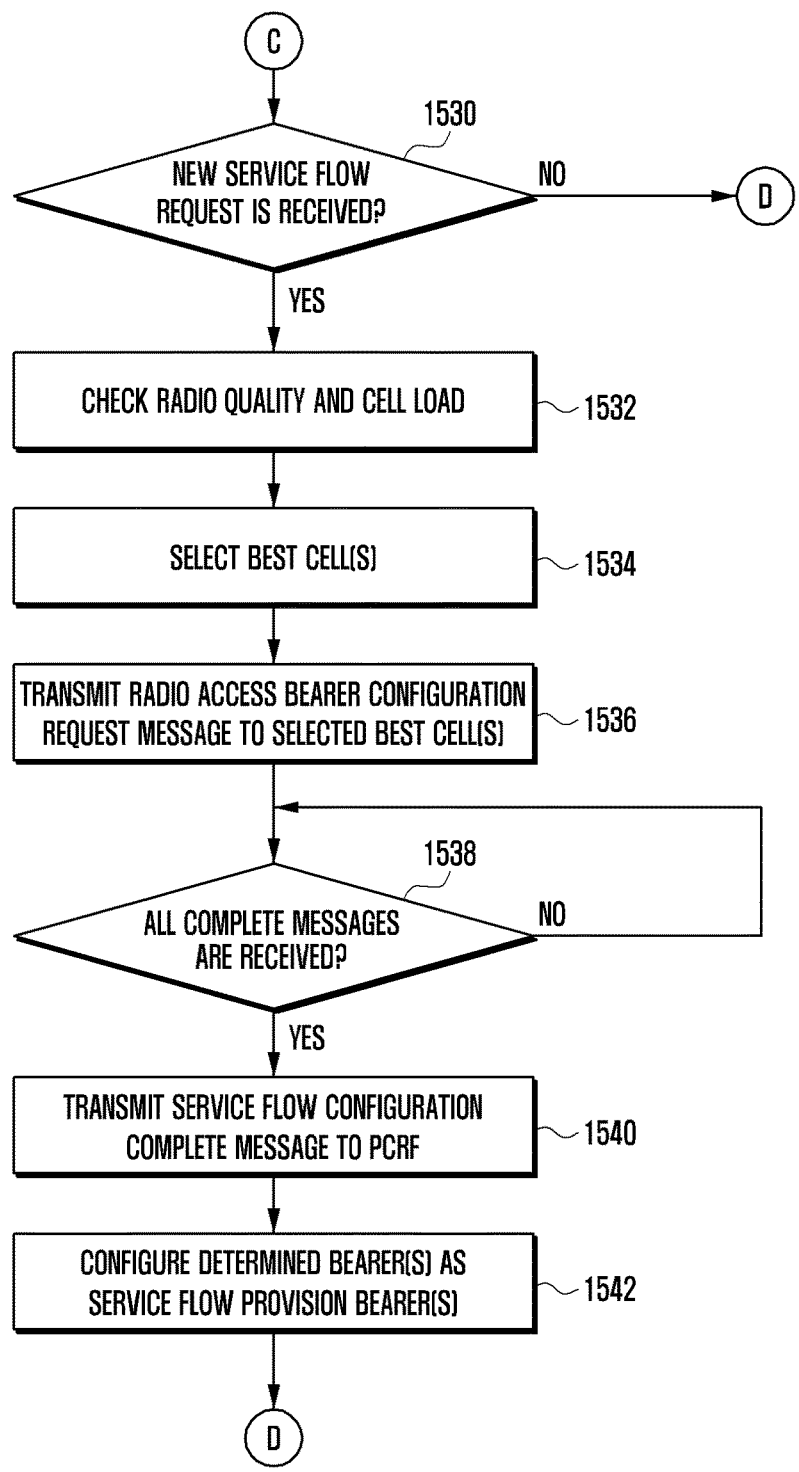

FIGS. 15A and 15B are a flowchart illustrating the bearer management procedure for a gateway to provide an electronic device with a service flow, according to an embodiment of the present invention.

The control unit 1402 of the gateway provides the electronic device(s) a service, in step 1500. Providing the electronic device(s) the service includes a process in which the gateway 300 transmits data to the electronic device(s) from the base stations. The control unit 1402 determines whether a scheduling information message is received from one or multiple base stations in the course of the service, in step 1502. Receiving the scheduling information message corresponds to step 408 or 410 of FIG. 4, step 512 or 514 of FIG. 5, step 608 or 610 of FIG. 6, step 702 or 704 of FIG. 7, step 808 or 810 of FIG. 8, or step 910 or 912 of FIG. 9.

If the scheduling information message is received, the procedure continues to step 1504, and if the scheduling information message is not received, the procedures continues to step 1530.

The control unit 1402 updates the scheduling table information, in step 1504, and determines whether any bearer configuration change is required per base station, in step 1506. The bearer configuration change determination may be made by checking the information on the CQI per the electronic device and the loads of the base stations, which is included in the scheduling information message received from the base station(s). For example, if the channel quality of the radio bearer established between the electronic device and the base station deteriorates, it may be necessary to change the bearer configuration. In another example, if the load of a specific base station increases abruptly, and thus, there is no room for providing the service flow, e.g. if the load level of the base station is greater than a predetermined threshold (70%, 80%, or 90%), it may be necessary to change the bearer configuration.

If it is necessary to change the bearer configuration at step 1506, the procedure continues to step 1508, and if it is not necessary to change the bearer configuration, the procedure continues to step 1520.

In step 1508, the control unit 1402 may transmit a radio access bearer configuration change request message to the multiple base stations, or a radio access bearer configuration change request message to at least one base station and a radio access bearer release request message to at least one other base station, which is described in greater detail above.

If two or more radio access bearer configuration change request messages are transmitted, this may correspond to steps 532 and 534 of FIG. 5 or steps 632 and 634 of FIG. 6. That is, steps 532 and 534 of FIG. 5 are performed when the channel quality of the radio bearer established between the base station and the electronic device deteriorates, and steps 632 and 634 of FIG. 6 are performed when the load of the base station becomes greater than a predetermined threshold. If it is necessary to change the data rate due to the abrupt increase of the load level or the drop of the channel quality of the radio bearer between the base station and the electronic device, the control unit 1402 transmits the radio access bearer configuration change request message including the identifier of the corresponding electronic device, service flow information, and target data rate to the respective base station by means of the base station communication unit 1401.

When the control unit 1402 transmits the radio access bearer configuration change request message to one base station and the radio access bearer release request message to the other base station, this may correspond to steps 632 and 634 of FIG. 6 or steps 716 and 718 of FIG. 7. This is the case when the channel condition of the radio bearer between a specific base station and the electronic device deteriorates to the extent that it is no longer possible to continue communication or when the load level is so high that it is impossible to support the data rate required for providing the service flow to the electronic device. In this case, the control unit 1402 transmits the radio access bearer release request message to the base station of which radio bearer established with the electronic device has to be released by means of the base station communication unit 1401. The control unit 1402 also transmits the radio access bearer configuration change request message requesting for increase of the data rate to the base station, which has to accommodate the data rate of the radio bearer released in association with the other base station, to the corresponding base station by means of the base station communication unit 1401.

After transmitting the radio access bearer configuration change request message to both the base stations or after transmitting the radio access bearer configuration change request message to one base station and the radio access bearer delete request message to the other base station, the control unit 1402 determines whether the operation complete messages are received form the respective base stations, in step 1510. The type of the operation complete message is determined depending on the type of the received request message. For example, if the radio access bearer configuration change request message for decreasing data rate is transmitted to one base station and the radio access bearer configuration change request message for increasing data rate is transmitted to the other base station, both the received operation complete messages are the radio access bearer configuration change complete messages.

If the radio access bearer release request message is transmitted to one base station and the radio access bearer configuration change request message for increasing the data rate is transmitted to the other base station, the received operation complete messages may be the radio access bearer release complete message and the radio access bearer configuration change complete message.

If the operation complete message is received from all of the base stations at step 1510, the procedure continues to step 1512 and if the operation complete message is not received from all of the base stations, the procedure waits until the operation complete message is received from all the base stations. A time period for receiving the operation complete messages can be set if necessary.

In step 1512, the control unit 1402 configures the changed bearer(s) as service flow provision bearer(s) and returns the procedure to step 1500. If the radio access bearer configuration change request message for decrease of data rate is transmitted to one base station and the radio access bearer configuration change request message for increase of data rate is transmitted to the other base station, the bearers are changed just in data rate. Otherwise, if the radio access bearer release request message for deletion of the radio bearer is transmitted to one base station and the radio access bearer configuration change request for increase of data rate is transmitted to another base station, this means one bearer is released, and thus, the control unit 1402 reconfigures the other bearer(s) to provide the service flow without the released bearer and returns the procedure to step 1500.

If it is determined at step 1506 that there is no need of changing the bearer configuration, the control unit 1402 determines whether bearer rearrangement is necessary, in step 1520. If it is determined that bearer rearrangement is necessary, the procedure continues to step 1522, and if it is determined that bearer rearrangement is not necessary, the procedure returns to step 1500.

In step 1522, the control unit 1402 generates a radio access bearer rearrangement request message to the corresponding base station and transmits this message by means of the base station communication unit 1401. The radio access bearer rearrangement request message transmission may correspond to step 920 of FIG. 9. The rearrangement request message may include at least one of the identifier of the service flow provided to the electronic device, the identifier of the electronic device, and the identifier of the base station that rearranges the radio bearer.

After transmitting the radio access bearer rearrangement request message to the corresponding base station, the control unit 1402 waits to receive a rearrangement complete message from the corresponding base station, in step 1524. If the rearrangement complete message is received from the corresponding base station by means of the base station communication unit 1401, the control unit 1402 updates the scheduling table based on the rearrangement result, in step 1526. The control unit 1402 configures the rearranged bearer(s) as the service flow provision bearer(s), in step 1528, and returns to step 1500. If there is another service flow provided to the electronic device that is handed over to another base station, the radio bearer for the corresponding service flow may be included.

Referring now to FIG. 15B, if no scheduling information message is received at step 1502, the control unit 1402 determines whether a new service flow is requested, in step

1530. If a new service flow is requested, this is the case where a service flow configuration request message is received from the PCRF 350 by means of the network communication unit 1404, and corresponds to step 422 of FIG. 4 or step 822 of FIG. 8.

If a new service flow request message is received at step 1530, the procedure continues to step 1532, and if the new service flow request message is not received, the procedure returns to step 1500. In step 1532, the control unit 1402 looks up the scheduling information table to check the channel quality and cell load level.

After checking the channel quality and cell load level, the control unit 1402 selects the best cell(s) for providing the requested service flow, in step 1534. At this time, it may be possible to configure multiple base stations to participate in providing one service flow to one electronic device. Even when two or more service flows are provided to one electronic device, it is possible to configure multiple base stations to relay respective service flows or to participate in relaying one of the service flows.

After selecting the best cell(s), in step 1534, the control unit 1402 generates a radio access bearer configuration request message to the selected cell(s) and controls the base station communication unit 1401 to transmit this message, in step 1536. When it is determined to provide one or more service flows through at least two cells, the radio access bearer configuration request message may be transmitted to the respective base stations. The radio access bearer configuration request message may include the electronic device identifier, service flow identifier, and required data rate information.

After transmitting the radio access configuration request message to the respective cells, the control unit 1402 determines whether the operation complete message is received from all of the base stations participated in providing the newly requested service flow(s), in step 1538. For example, if the radio access bearer configuration request message has been transmitted to two or more base stations, the operation complete message has to be received from all the base stations to which the radio access bearer configuration request message has been transmitted. The operation complete message may be the radio access bearer configuration complete message notifying of the completion of the radio bearer configuration at the base station for providing the requested service flow to the electronic device.

If the radio access bearer configuration complete message is received at step 1538, the control unit 1402 generates a service flow configuration complete message for transmission to the PCRF 350. Then, the control unit 1402 controls the network communication unit 1404 to transmit the service flow configuration complete message to the PCRF 350, in step 1540.

The control unit 1402 configures the determined bearer(s) as service flow provision bearer, in step 1542, and the procedure returns to step 1500 to provide the service to the respective electronic devices.

As described above, the bearer management method and apparatus of the embodiments of the present invention is advantageous in terms of allocating two or more bearers to an electronic device using an antenna array and transmitting data through the multiple bearers allocated to the electronic device in a radio communication system. Also, the bearer management method and apparatus of the embodiments of the present invention is advantageous in terms of allocating bearers to the electronic device using an array antenna in adaptive to the channel condition and transmitting data through the allocated channels adaptively.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for bearer management by a gateway in a wireless communication system, the method comprising:
   receiving data through a service flow;
   identifying channel qualities or loads of at least two cells based on scheduling information in the gateway;
   determining whether multiple bearers associated with the service flow are required to be configured based on the channel qualities or loads of the at least two cells;
   transmitting, to the at least two cells, request messages for configuring the multiple bearers if the multiple bearers associated with the service flow are required to be configured;
   determining whether bearer reconfiguration is required if the scheduling information is updated;
   transmitting, to a first cell of the at least two cells, a control message including an identifier of a second cell to which service is handed over, if the bearer reconfiguration is required; and
   transmitting, to a terminal, data through at least one reconfigured bearer if a response message for the control message is received from the first cell.

2. The method of claim 1, further comprising transmitting, to a policy control entity, a second control message if response messages are received from the at least two cells.

3. The method of claim 1, further comprising updating the scheduling information based on a scheduling message if the scheduling message is received from at least one cell of the at least two cells.

4. The method of claim 3, further comprising:
   determining whether the bearer reconfiguration is required based on the scheduling information if the scheduling information is updated;
   transmitting, to at least one cell of the at least two cells, a third control message for the bearer reconfiguration if the bearer reconfiguration is required; and
   transmitting, to the terminal, the data through the at least one reconfigured bearer if a fourth-control message in response to the third control message is received from the at least one cell of the at least two cells.

5. The method of claim 1, further comprising updating the scheduling information if the response message is received from the first cell.

6. The method of claim 3, wherein the scheduling message comprises at least one of load information of a cell and channel quality of the cell.

7. The method of claim 1, wherein the scheduling information comprises an antenna identifier of the terminal.

8. The method of claim 7, wherein the scheduling information further comprising at least one of an identifier of at least one bearer, a service class, a priority, a maximum bit rate (MBR), a guaranteed bit rate (GBR), a delay, a packet error rate, application type, an identifier of a base station, channel quality of a cell, and load information of the cell.

9. A gateway apparatus for bearer management in a wireless communication system, the apparatus comprising:
   a network communication unit configured to communicate with a correspondent node providing an electronic device with a service flow and information necessary for providing the service flow;

a base station communication unit configured to communicate data of the service flow and service flow configuration and change request signals with base stations connected hierarchically;

a memory configured to store scheduling information messages received from the base stations; and a control unit configured to:
- receive data through the service flow,
- identify channel qualities or loads of at least two cells based on scheduling information,
- determine whether multiple bearers associated with the service flow are required to be configured based on the channel qualities or loads of the at least two cells,
- transmit to the at least two cells, request messages for configuring the multiple bearers if the multiple bearers associated with the service flow are required to be configured,
- determine whether bearer reconfiguration is required if the scheduling information is updated,
- transmit to a first cell of at least two cells, a control message including an identifier of a second cell to which service is handed over, if the bearer reconfiguration is required, and
- transmit, to a terminal, data through at least one reconfigured bearer if a response message for the control message is received from the first cell.

10. The apparatus of claim 9, wherein the control unit is further configured to transmit, to a policy control entity, a second control message, if response messages are received from the at least two cells.

11. The apparatus of claim 9, wherein the control unit is further configured to update the scheduling information based on a scheduling message, if the scheduling message is received from at least one cell of the at least two cells.

12. The apparatus of claim 11, wherein the control unit is further configured to determine whether the bearer reconfiguration is required based on the scheduling information if the scheduling information is updated, transmit, to at least one cell of the at least two cells, a third control request message for the bearer reconfiguration if the bearer change reconfiguration is required, and transmit, to the terminal, the data through the at least one reconfigured bearer if a fourth control message in response to the third control message is received from the at least one cell of the at least two cells.

13. The apparatus of claim 9, wherein the control unit is further configured to update the scheduling information if the response message is received from the first cell.

14. The apparatus of claim 11, wherein the scheduling message comprises at least one of load information of a cell and channel quality the cell.

15. The apparatus of claim 9, wherein the scheduling information comprises an antenna identifier of the terminal.

16. The apparatus of claim 15, wherein the scheduling information further comprising at least one of an identifier of at least one bearer, a service class, a priority, a maximum bit rate (MBR), a guaranteed bit rate (GBR), a delay, a packet error rate, application type, an identifier of a base station, channel quality of a cell, and load information of the cell.

* * * * *